(12) United States Patent
Austin et al.

(10) Patent No.: US 11,908,208 B2
(45) Date of Patent: Feb. 20, 2024

(54) INTERFACE SHARPNESS DISTRACTION MITIGATION METHOD AND SYSTEM

(71) Applicant: TOYOTA MOTOR ENGINEERING & MANUFACTURING NORTH AMERICA, INC., Plano, TX (US)

(72) Inventors: Benjamin P. Austin, Saline, MI (US); George M. Evans, Ann Arbor, MI (US); Joshua E. Domeyer, Madison, WI (US); John K Lenneman, Okemos, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 204 days.

(21) Appl. No.: 17/074,727

(22) Filed: Oct. 20, 2020

(65) Prior Publication Data

US 2022/0121865 A1    Apr. 21, 2022

(51) Int. Cl.
| | |
|---|---|
| *G06V 20/00* | (2022.01) |
| *G06V 20/59* | (2022.01) |
| *B60W 40/09* | (2012.01) |
| *G06V 10/25* | (2022.01) |

(Continued)

(52) U.S. Cl.
CPC .............. *G06V 20/59* (2022.01); *B60W 40/09* (2013.01); *G06V 10/25* (2022.01); *G06V 20/588* (2022.01); *G06V 40/193* (2022.01); *B60W 2540/225* (2020.02)

(58) Field of Classification Search
CPC ...... G06V 20/59; G06V 10/25; G06V 20/588; G06V 40/193; B60W 40/09; B60W 2540/225; B60W 2554/4048; G06F 3/013; A61B 5/163; H04N 13/383; H04N 25/61; G06T 5/003; G06T 5/006; G06T 2207/20201

See application file for complete search history.

(56) References Cited

U.S. PATENT DOCUMENTS

| | | |
|---|---|---|
| 8,248,458 B2 | 8/2012 | Schowengerdt et al. |
| 9,140,903 B2 | 9/2015 | Hatakeyama et al. |
| 10,131,229 B2 | 11/2018 | Webb et al. |

(Continued)

FOREIGN PATENT DOCUMENTS

DE    199 06 706 A1    8/2000

*Primary Examiner* — Molly Wilburn
*Assistant Examiner* — Ahmed A Nasher
(74) *Attorney, Agent, or Firm* — Oblon, McClelland, Maier & Neustadt, L.L.P.

(57) ABSTRACT

A driver monitor system and method of optimizing use of cognitive resources of a user in a vehicle is disclosed. The system includes in-cabin video cameras, a display device, and processing circuitry. The method performed by the processing circuitry includes monitoring eye gaze direction using images from the in-cabin video cameras, gradually softening image regions and lines displayed in the display device that are outside a first vision area of the user of the vehicle, and using the eye gaze direction to predict whether the user is transitioning into a new focus vision area that had been outside the first vision area. When the user's eyes begin to move, begin sharpening softened image regions and lines such that by the time eyes have shifted into the new focus vision area, the image regions and lines in the new focus vision area reach full sharpness.

19 Claims, 16 Drawing Sheets

(51) Int. Cl.
    *G06V 20/56*         (2022.01)
    *G06V 40/18*         (2022.01)

(56) References Cited

U.S. PATENT DOCUMENTS

| | | | |
|---|---|---|---|
| 10,503,935 | B1 | 12/2019 | Hadsall |
| 10,915,180 | B2 * | 2/2021 | Marggraff ............. G06F 3/0485 |
| 11,104,272 | B2 * | 8/2021 | Border ............... G02B 27/0172 |
| 2008/0161997 | A1 | 7/2008 | Wengelnik et al. |
| 2017/0316264 | A1 * | 11/2017 | Gustafsson ............. G06F 3/012 |
| 2019/0050664 | A1 * | 2/2019 | Yang ....................... G06F 3/011 |
| 2019/0065790 | A1 | 2/2019 | Jones |
| 2021/0182609 | A1 * | 6/2021 | Arar ....................... G06V 10/82 |
| 2021/0394775 | A1 * | 12/2021 | Julian ................... G08G 1/164 |
| 2021/0397859 | A1 * | 12/2021 | Arora .................. G06V 10/143 |

* cited by examiner

INTERFACE SHARPNESS DISTRACTION MITIGATION METHOD AND SYSTEM

BACKGROUND

Technical Field

The present disclosure is directed to a method of optimizing use of cognitive resources by blurring or softening image regions/lines of displayed images in the periphery of the visual field of a driver's eyes, to use cognitive resources efficiently while driving a vehicle, especially when performing mission-critical tasks.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There are numerous proposals about methods for reducing driving distractions.

US 2019/0065790 to Alan Jones describes a method of displaying content on a screen of an electronic processing device. The data processing application is also configured to monitor at least one sensor of the electronic processing device such as the device's camera to receive at least one biometric data input during display of the content on the screen. Where a person determined to be viewing the screen makes a significant head movement where it can be determined that they are no longer looking at the screen, the data processing application may cause the display of the content on the screen to be halted or at least the screen to be blurred such that the details of the displayed content is distorted or masked. The reference goes on to indicate that in some embodiments, eye tracking software alone could be used in place of facial recognition software.

A method has been disclosed that teaches reallocating cognitive resources by blurring or softening image regions/lines in the periphery.

US 2008/0161997 to Heino Wengelnik et al. describes a method of representing items of information in an instrument cluster for a motor vehicle. An exemplary embodiment provides a device for tracking the eye position, which is connected to the control unit. Via control unit and a suitable drive, a mask is displaced as a function of the eye position so as to follow the eye position. Objects or menus or menu items that are of low relevance or importance for the viewer in a specific display image may be displayed blurred, and/or in a plane that is offset away from the viewer.

U.S. Pat. No. 10,503,935 to Jacob Hadsall describes a system and method for concealing sensitive data on a computing device. When no one is looking at a display screen of a client computing device, such as sensitive information relating to auto, home, life, or renters insurance, banking, and/or vehicle loans, the computing device may blur or obscure the viewport of the display.

U.S. Pat. No. 10,131,229 to Gareth Webb et al. describes an electronic meter cluster for a vehicle. Based on a change in the information being conveyed to the driver, the meter control module is configured to modify at least one of sharpness of the numerals, size of the numerals, one or more colors of the display, brightness of the needle, and length of the needle. In particular, the meter control module may control the display screen to blur all of the numerals, and all of the tick marks, spaced apart from the numeral that the needle is pointing to.

U.S. Pat. No. 9,140,903 to Yoshiyuki Hatakeyama et al. describes a vehicle information transmitting device capable of resolving the bothersome that occurs when the light is strong. Luminance of the light is adjusted to change the blurring degree of the virtual image according to the farness and closeness from the center view.

U.S. Pat. No. 8,248,458 to Brian Schowengerdt et al. describes a variable fixation viewing distance scanned light display. The reference describes a video display in which a viewer is able to direct their gaze to a blurry object in the background of the image, and have the object be brought into sharp focus.

A method has been disclosed that determines the peripheral view in the interior of the vehicle according to where the eyes are currently gazing (i.e., the gaze point) via eye-tracking techniques.

DE 19906706 to Haenel describes an instrument panel with a virtual display for a motor vehicle. The virtual display enables a driver to view instrument without distraction from blurred images of instruments at the outer periphery of his field of view. Two sensors detect the drivers eye position and through the control unit control a drive to adjust the second mirror to match the drivers current field of view.

A paper by D. H. Hubel and T. N. Wiesel, "Receptive Fields of Single Neurones in the Cat's Striate Cortex," found that when a transparent sheet was moved on a projector, a line moved and this caused a change in the cats neuron firing. Other firings occurred when there was a change in orientation, or a specific movement of the line. In general, it was determined that the occipital cortex in the back of the cat's brain responds specifically to edges and well defined sharp lines.

There is a need for a system and method that enables optimization of cognitive resources for processing sharp edges/lines to the immediate task at hand where the eyes are fixated especially in potentially dangerous driving conditions.

SUMMARY

An aspect is a driver monitor system for optimizing cognitive resources of a user in a vehicle. The system includes at least one in-cabin video camera; a display device; and processing circuitry configured to monitor eye gaze direction using images from the at least one in-cabin video camera, gradually soften image regions and lines displayed in the display device that are outside a first focus vision area of the user of the vehicle, use the eye gaze direction to predict whether the user is transitioning into a new focus vision area that had been outside the first focus vision area, and when the user's eyes begin to move, begin sharpening softened image regions and lines such that by the time eyes have shifted into the new focus vision area, the image regions and lines in the new focus vision area reach full sharpness.

An aspect is a method of optimizing cognitive resources of a user in a vehicle with a driver monitor system. The system includes at least one in-cabin video camera, a display device, and processing circuitry. The method including monitoring, by the processing circuitry, eye gaze direction using images from the at least one in-cabin video camera; gradually softening image regions and lines displayed in the display device that are outside a first focus vision area of the user of the vehicle; using the eye gaze direction to predict whether the user is transitioning into a focus vision area that had been outside the first focus vision area; and when the user's eyes begin to move, begin sharpening softened image regions and lines such that by the time eyes have shifted into the new focus vision area, the image regions and lines into the new focus vision area reach full sharpness.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
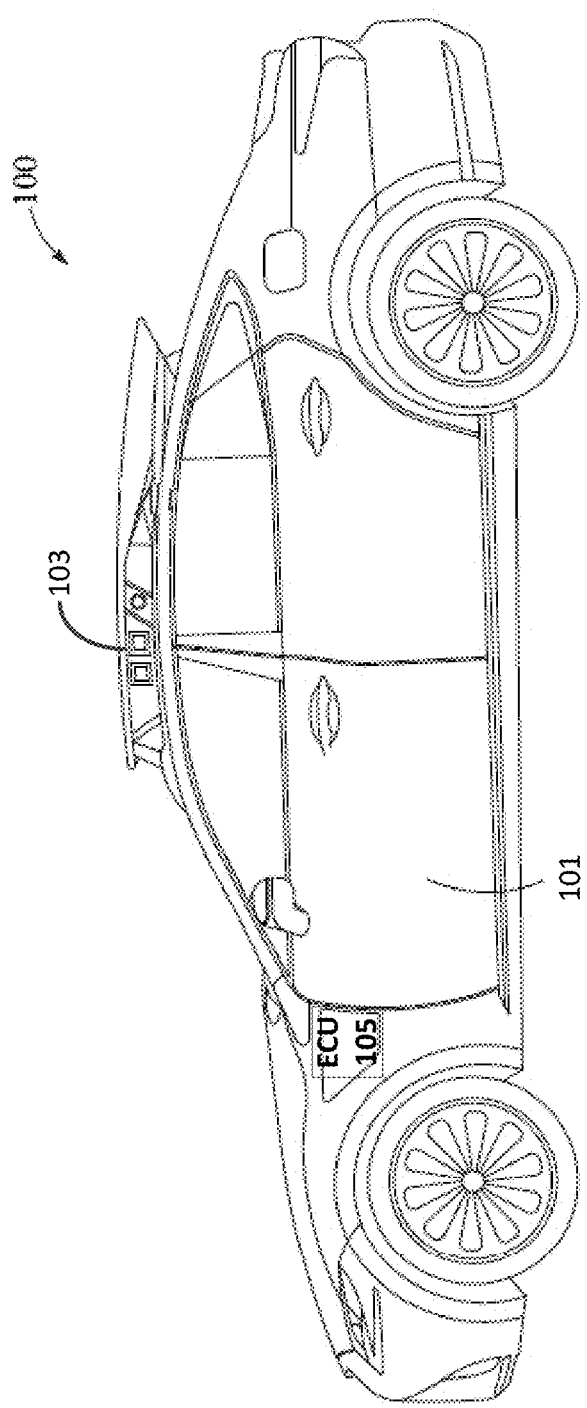
FIG. 1 illustrates a vehicle having an array of exterior sensors.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

A system and method of increasing cognitive resources when performing mission-critical tasks, such as driving in heavy rain, snowstorms, construction zones, or other potentially dangerous driving conditions is disclosed.

Provided the teachings in the paper by Hubel et al., the inventors have concluded that when sharp lines are present, the brain is engaged more, as opposed to when softer edges/lines are present. In other words, the brain uses more metabolic resources (i.e., blood, oxygenation, etc.) when processing sharp lines and edges versus softer lines and edges because detecting sharp lines and edges is a specialized function of a subset of neurons. Hence, when sharp lines are present in the peripheral view for task-irrelevant information, metabolic and thus, cognitive resources are being consumed unnecessarily. Such a circumstance is an inefficient use of metabolic resources, which should instead be allocated to task-supporting neural regions. An aspect is to soften image regions with edges and lines outside and away from the focus vision area. Blurred/softened lines do not lead to firing of the subset of neurons in the human visual cortex. An aspect is to gradually change from sharp image regions/lines to softened image regions/lines as the person shifts focus away from the focus vision area in an image. An aspect is to quickly sharpen image regions/lines in an image in anticipation of a person shifting their head to a new focus vision area. By softening image regions/lines outside of the focus vision area of a driver's vision, the cognitive resources freed up by blurring or softening image regions/lines of task-irrelevant images in the periphery can be reallocated to other brain regions necessary for supporting the driver, to use cognitive resources efficiently while driving a vehicle, especially when performing mission-critical tasks. An abrupt change from softer to sharper image regions/lines may help to draw attention in order to reduce time in focusing on a display image so that the driver can revert back to focusing on the task at hand. Conversely, a gradual, inconspicuous change from sharp to softer image regions/lines may minimize—or potentially eliminate—the drawing of attention to task-irrelevant information in the periphery so that the driver can continue focusing on the task at hand. Although the term "soften", e.g., softened, softening, softens, softer, is used in this disclosure, it should be understood that the term "smooth", e.g., smoothed, smoothing, smooths, smoother, could be used as well without departing from the intended meaning of the softening function that is performed, as further described below.

FIG. 1 illustrates a passenger vehicle of a type ranging from those equipped with advanced driver-assist features to those equipped as a fully autonomous vehicle, or self-driving vehicle.

Referring to FIG. 1, a vehicle 100 includes an array of sensors 103 and a controller, ECU 105. Sensors may be mounted on a roof of a vehicle, mounted on the vehicle body 101, and may be included within the body of a passenger vehicle, or a combination thereof. The types of sensors that may be mounted on an exterior of a vehicle may include radar, LiDAR, video cameras, and sonar antennas. Video cameras, radar antennas, and sonar antennas may be located around a periphery of the vehicle. In particular, the passenger vehicle may be fitted with forward-looking cameras to detect traffic signals, as well as front-mounted sensors to detect other vehicles, pedestrians, and obstacles, or to determine traffic conditions, such as intersections and merging traffic lanes, in the vehicle's vicinity. The combination of sensors may be used to assist drivers in choosing the safest routes possible, or may provide information needed for operation of an autonomous vehicle. In particular, a passenger vehicle 100 may include other sensors for advanced control and navigation, including GPS, odometry and internal measurement units.

Figure 2:
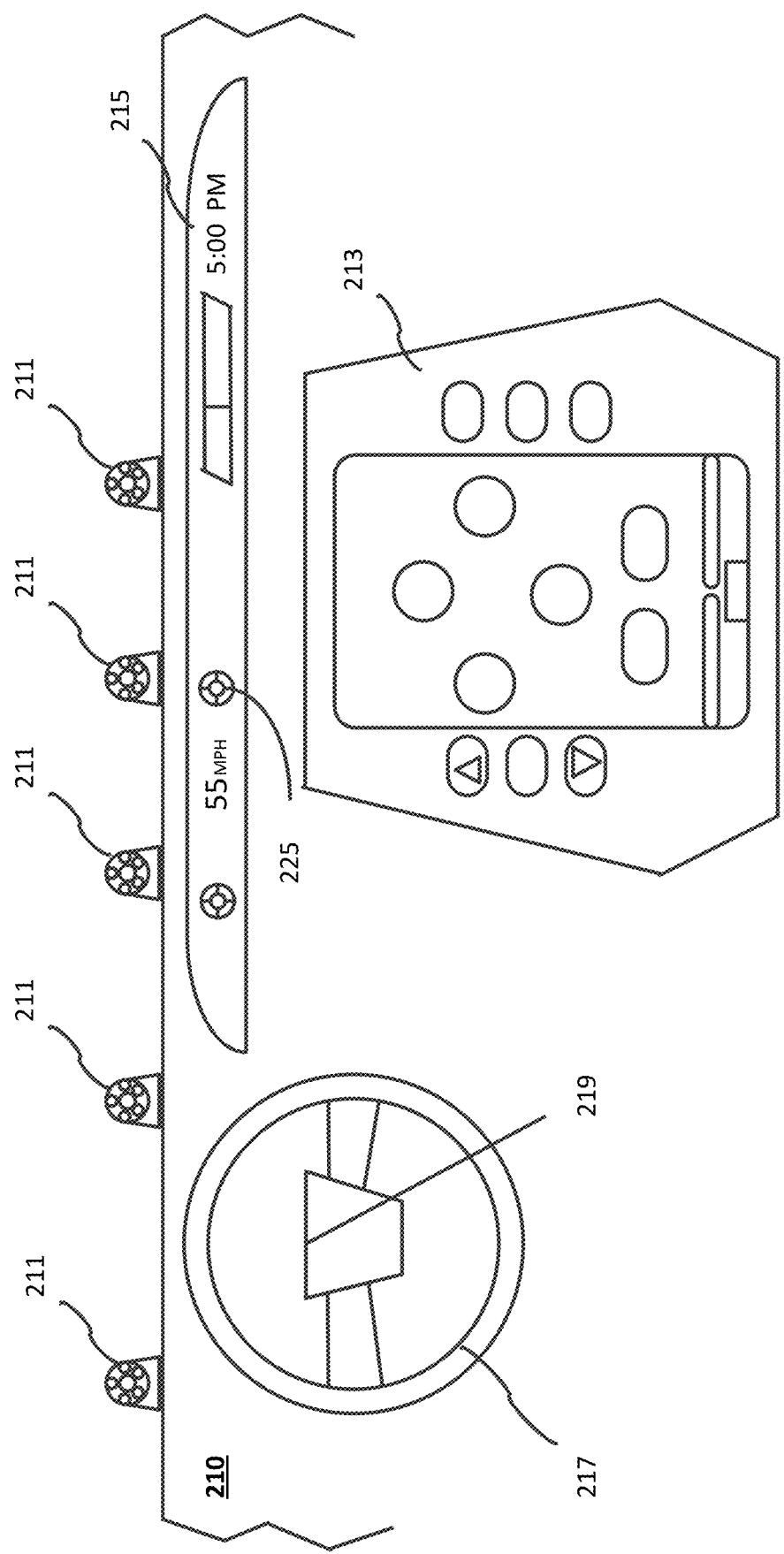
FIG. 2 illustrates sensor and displays for an interior of a vehicle in accordance with an exemplary aspect of the disclosure.

FIG. 2 illustrates sensor and displays for an interior of a vehicle in accordance with an exemplary aspect of the disclosure. In addition to an instrument panel 215, which may include at least a speedometer 225 to measure and display a speed of a vehicle, a vehicle 100 may include a navigation, or infotainment, interactive display 213. The interior cabin of the vehicle may include one or more in-cabin cameras 211. In-cabin cameras 211 may be mounted on a vehicle dashboard 210, along the ceiling, embedded in the dash, in the rear-view mirror, or even in the steering wheel 217 or on the steering column. A digital instrument panel 215 may be included above the navigation display in a vicinity of the center of the dashboard 210.

Figure 3:
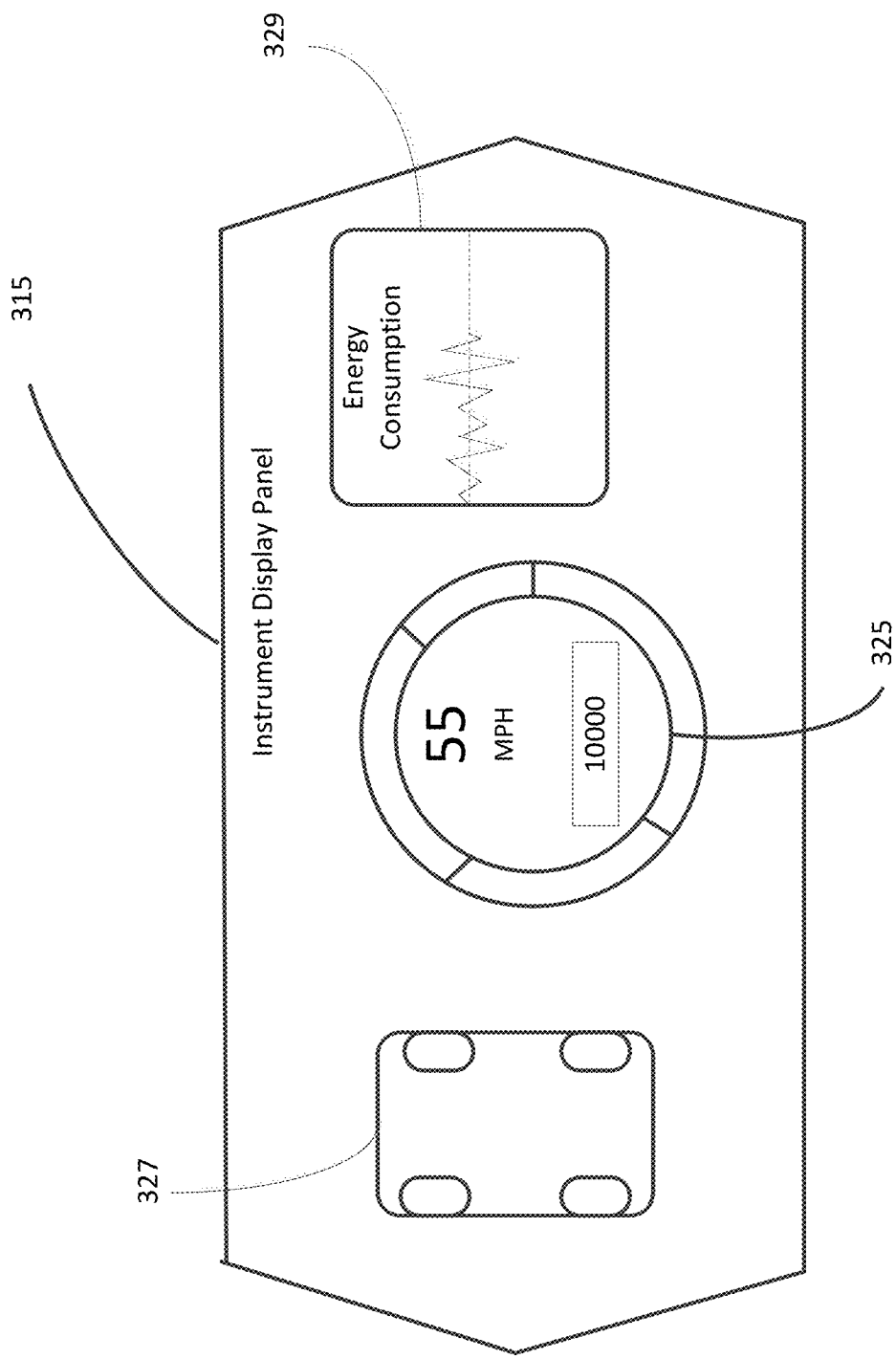
FIG. 3 illustrates an alternative instrument display panel for a vehicle in accordance with an exemplary aspect of the disclosure.

Conventional instrument panels are located behind the steering wheel, directly in front of the driver so that the driver may look at a gauge by glancing slightly downward. FIG. 3 illustrates an instrument display panel for a vehicle in accordance with an exemplary aspect of the disclosure. The instrument display panel 315 may consist of analog and/or digital gages and other display items, such as a display for tire pressure 327 and fuel level. As a minimum, an instrument panel may include the speedometer 325. In the case of an electric or hybrid vehicle, the instrument display panel 315 may include an energy consumption display 329.

The instrument display panel 315 may include a switchable display that can be switched to different display screens, such as various display screens that display vehicle status information, such as oil condition, warning messages, such as low tire pressure, low fuel, control options such as navigation control, and other display functions in some cases dependent on whether the vehicle is moving or stopped.

Figure 4A:
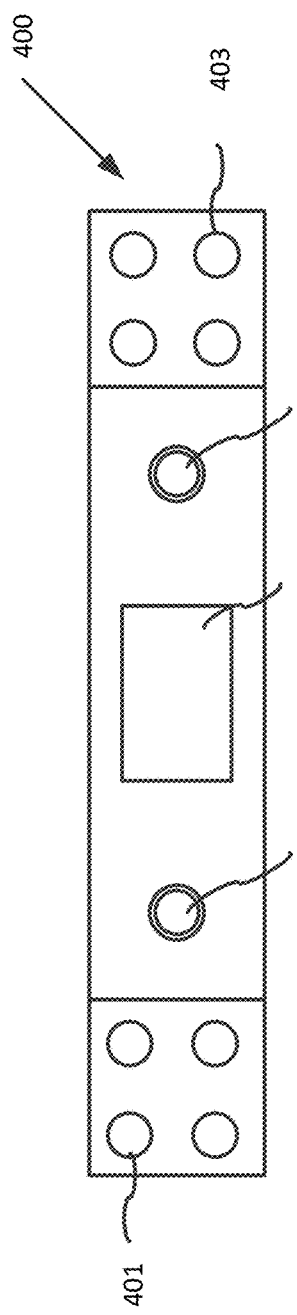
FIGS. 4A, 4B is a device for acquiring a combined eye gaze image of a driver in accordance with an exemplary aspect of the disclosure.

FIG. 4A shows a device 400 for acquiring a combined eye gaze image of a driver according to an embodiment of the present invention (This figure and following description were taken from a Smart Eye patent—U.S. Pat. No. 10,007, 337, as an example of an eye gaze imaging device). When a light source is close to the optical axis of the imaging system there will be an internal reflection in the eye which appears brighter than the surrounding, called bright eye effect. If the light source is sufficiently removed from the optical axis, the light source will illuminate the eye and the surrounding area without causing an internal reflection, referred to as dark eye effect. The device is especially adapted for detection and analysis of eye gaze in dark-eye effect conditions. A device according to the invention may be implemented in many types of applications, such as integrated in a vehicle dashboard or at the screen of a mobile device. The device 400 comprises a control unit 409, a first camera 405, a second camera 407, a first light source 401 and a second light source 403. The first camera 405 and the second camera 407 are preferably electronic image sensor cameras, either of snapshot type or delivering a stream of consecutive images. The images can be in a digital format, e.g. a bitmap format, or in analog form which then can be converted to a digital format, e.g. using a framegrabber circuit (not shown). In the illustrated example each of the first light source 401 and the second light source 403 comprises four light emitting diodes (LEDs). The electromagnetic waves emitted by the LEDs can be of different types, including IR radiation. In some cases it is preferred that the waves are within a relatively narrow wave length range outside the range of visible light, and that each camera is provided with a band pass filter corresponding to this range. The influence from the surrounding light is thereby further reduced, as many light sources (computer screens, fluorescent lamps, etc.) practically only emit waves in the visible light range. The influence from other sources, e.g. the sun, can be reduced if the total radiated energy in the wave band from the wave emitter is at least a significant fraction of the total sun radiation in the same band. In conventional arrangements with illumination of an object, quite large light sources are used, in order to accomplish active radiation with high intensity evenly distributed over the object. In the device according to the invention, however, each light source preferably has as small an aperture as possible, as this is distinguishable from illumination from another source. In conventional arrangements where LEDs are employed for illuminating an object with IR-radiation, normally more than 20 LEDs may be arranged in a rectangular pattern. In one embodiment, it may be sufficient with fewer LEDs in each light source. The number of LEDs can range from one to 19. In order to achieve a satisfying result, it is important that reflexes arising from illumination from the active light source are distinguishable by the image capturing device. Apart from the preferably small light source discussed above, the quality of the combined eye gaze image is dependent upon the ability of the camera to capture high intensity "point" sources of radiation.

Returning to FIG. 4A the device 400 in the illustrated example is a rectangular box with a primary extension in the horizontal direction. The device 400 is arranged at a distance of about 0.5-1 m to the driver.

The device 400 further comprises a control unit 409 to alternately illuminate the driver with a light source in one location while capturing an image frame with a camera in the other location. In the illustrated example the control unit 409 activates the first light source 401 so that it emits light 411 (or IR radiation) at the driver. Meanwhile the control unit 409 activates the second camera 407 to capture an image frame in its field of view 413.

Figure 4B:
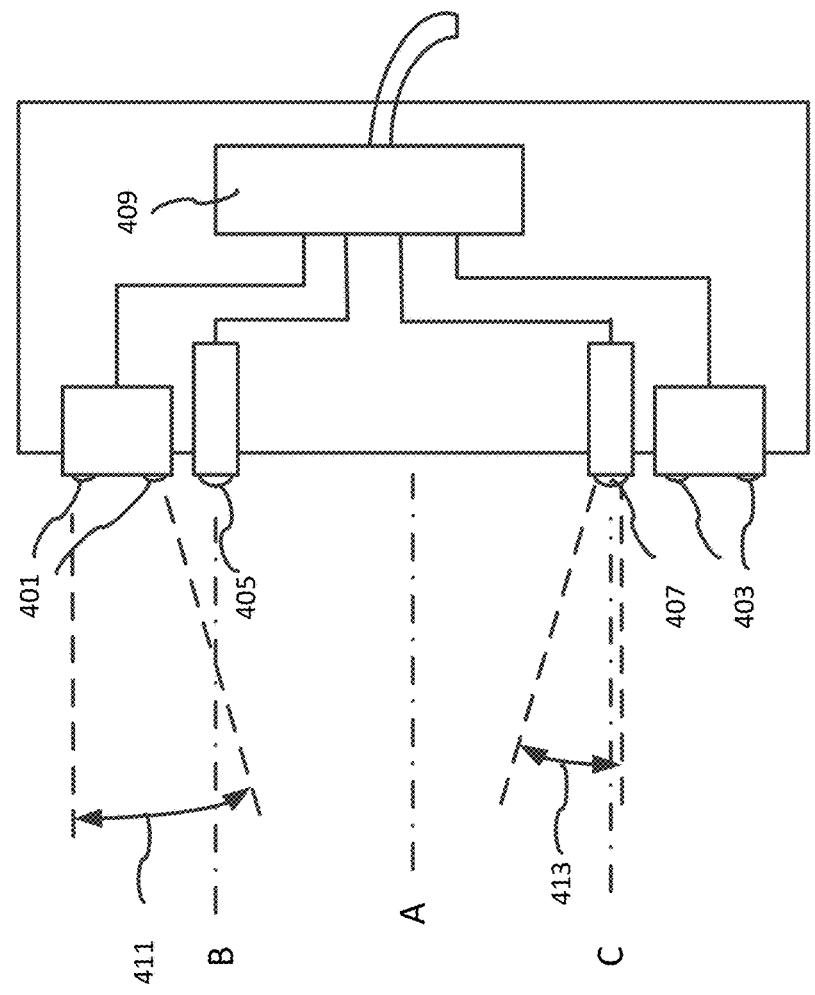

Referring to FIG. 4B the control unit 409 is connected to the first camera 405, the second camera 407, the first light source 401, and the second light source 403 to provide each with activation signals and to receive image frames from the first camera 405 and the second camera 407. The activation signals to the light sources can be provided by alternatingly turning the first 401 and the second 403 light sources on and off. Similarly the control unit 409 alternatingly sends an activation signal to each camera during which the active camera is capturing an image frame. In the illustrated example the control unit 409 is arranged to first activate the first camera 405 together with the second light source 403 to capture a first image frame. Subsequently the control unit will activate the second camera 407 together with the first light source 401 to capture a second image frame. The control unit 409, which has received each frame from the respective camera, can combine the information from each frame to provide a combined eye gaze image. The combined eye gaze image can be provided to an external unit or alternatively be used in the control unit 409 to, e.g., determine position, direction, etc. of the driver's eyes.

Returning to FIG. 4B the device 400 can be said to have a central optical axis A which represents the optical axis of the provided combined eye gaze image. The first camera 405 has an optical axis B and the second camera 407 has an optical axis C, both optical axis B and optical axis C are in the illustrated example essentially parallel to each other in the horizontal plane as seen from the object in FIG. 4A.

Preferably optical axes B and C converge slightly towards the central optical axis A. This may improve the possibility to triangulate in the combined eye gaze image.

Figure 5:
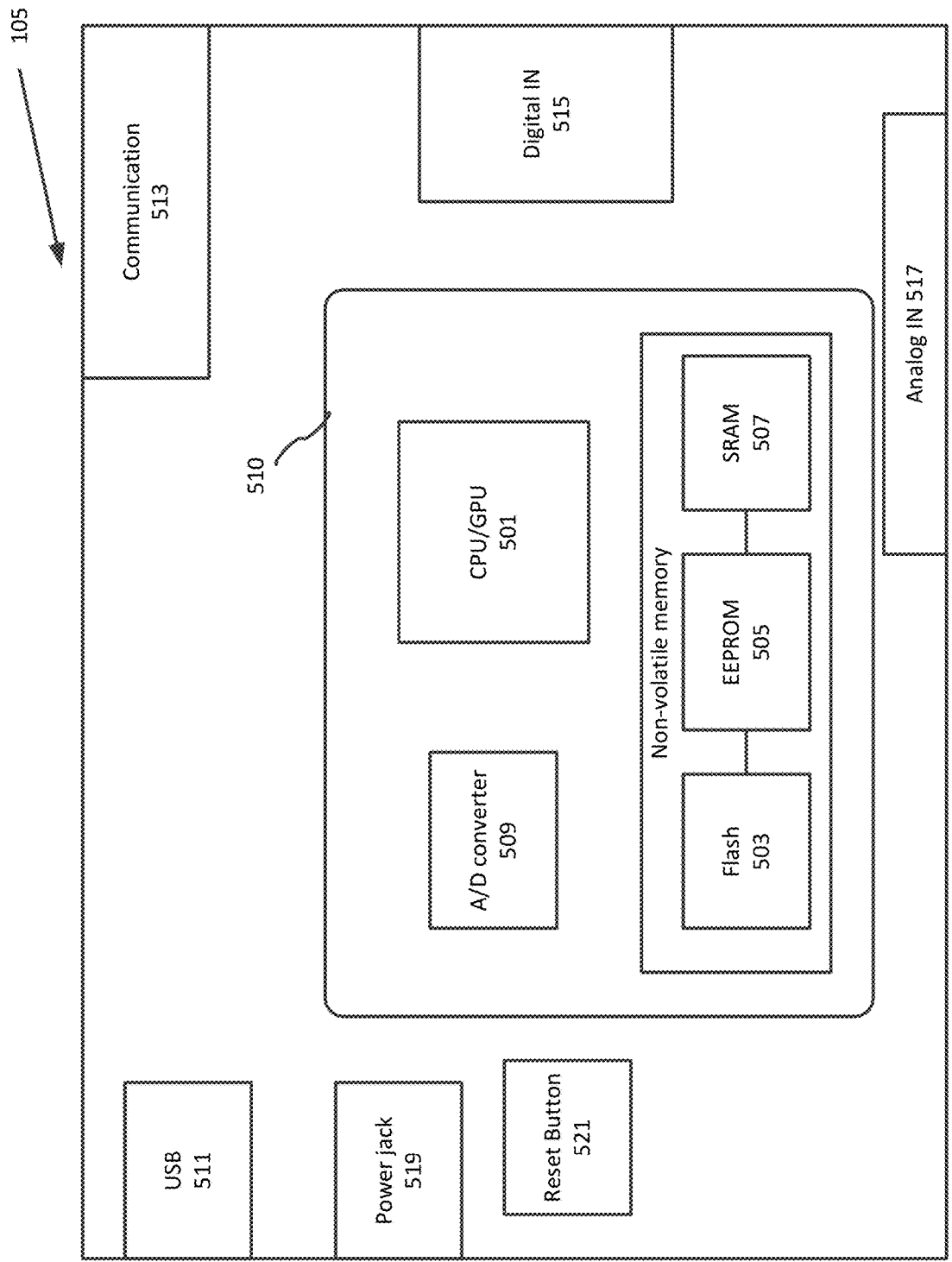
FIG. 5 is a block diagram of an electronic control unit in accordance with an exemplary aspect of the disclosure.

FIG. 5 is a block diagram of an electronic control unit in accordance with an exemplary aspect of the disclosure. The electronic control unit 105 may be based on a microcontroller. A microcontroller includes processing circuitry that may contain one or more processor cores (CPUs) along with memory (volatile and non-volatile) and programmable input/output peripherals. Program memory in the form of flash, ROM, EPROM, or EEPROM is typically included on chip, as well as a secondary RAM for data storage. In one embodiment, the electronic control unit 105 is an integrated circuit board with a microcontroller 510. The board includes digital I/O pins 515, analog inputs 517, hardware serial ports 513, a USB connection 511, a power jack 519, and a reset button 521. Other microcontroller configurations are possible. Variations can include the number of pins, whether or not the board includes communication ports or a reset button.

In an exemplary embodiment, the microcontroller may be a RISC-based microcontroller having flash memory 503, SRAM 507, EEPROM 505, general purpose I/O lines, general purpose registers, a real time counter, six flexible timer/counters, a A/D converter 509, and a JTAG interface for on-chip debugging. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

A passenger vehicle 100 may further include sensors such as one or more cameras and thermometers for monitoring the cabin environmental conditions at different portions of the interior. The cabin of a vehicle may include video cameras and infrared thermometer sensors for particularly monitoring persons and other objects within the vehicle cabin. A passenger vehicle may include internal sensors for particularly monitoring various conditions of the vehicle, such as steering angle and vehicle speed. Also, the vehicle engine may include various sensors for pressure, temperature, air flow and engine speed. Tires may include pressure sensors for measuring the tire pressure. Provided readings from some of the sensors, other parameters may be estimated or measured, which are referred to as estimators. For example, fuel usage rate may be estimated based on miles driven and change in fuel level reading. Also, temperature in the cabin may be measured as a heat map that is determined by several infrared thermometers positioned throughout the cabin.

Figure 6:
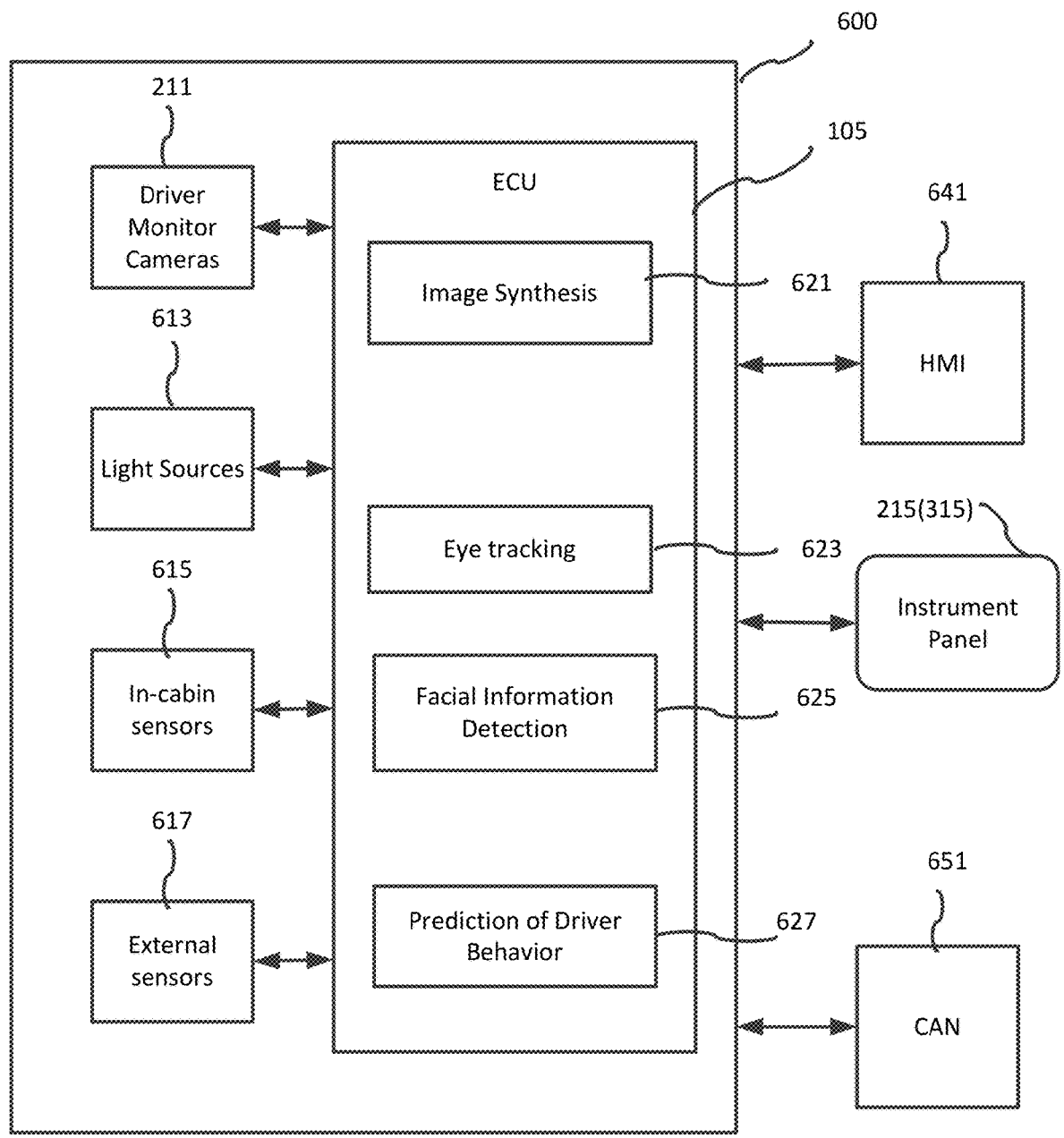
FIG. 6 is a block diagram of driver monitor system in accordance with an exemplary aspect of the disclosure.

FIG. 6 is a block diagram of driver monitor system in accordance with an exemplary aspect of the disclosure. Driver monitor systems may be included in various types of vehicles to enhance safety. Passenger vehicles may be driven by drivers that may not have had sufficient sleep or are driving for long periods of time. In a similar manner, trucks may be driven by truck drivers for extended periods of time. Truck driver safety is a concern when the truck driver does not get sufficient rest. Delivery trucks may be faced with driving in heavy traffic conditions and into neighborhoods or congested areas requiring utmost alertness. Thus, driver monitor systems include sensors, such as in-vehicle cameras, to monitor a driver's face, a driver's head position, track the driver's eye movement, the driver's posture in a seat, even other physical state conditions such as heart rate and facial blood flow. The driver monitor systems may include sensors to monitor the vehicle state, such as motion of the steering wheel and position of the vehicle relative to the road. To avoid driver distraction, the lighting for in-vehicle cameras may be infrared lighting.

Regarding FIG. 6, the driver monitor system 600 may include one or more driver monitor cameras 211 and associated light sources 613. The driver monitor cameras 211 and light sources 613 may be located at various positions in the cabin interior. The driver monitor cameras 211 may capture video images for different functions. At least two driver monitor cameras 211 may capture images of the driver's face and/or head. At least one driver monitor camera 211 may capture images of the driver's body posture while seated. At least one driver monitor camera 211 may be part of an eye tracking system (see FIGS. 4A, 4B).

The driver monitor system 600 may include other in-cabin sensors 615 for detecting the state of the driver or condition of the cabin environment, such as one or more touch free thermometers, heart rate monitor, and steering angle, to name a few.

The driver monitor system 600 may include at least one electronic control unit (ECU) 105. The electronic control unit 105 may perform various functions using data received from the sensors 211, 613, 615, 617. An image synthesis function 621 may combine images received from one or more driver monitor cameras 211. The image synthesis function 621 may combine images to form a single synthesized image without overlap. Alternatively, the image synthesis function 621 may combine two or more images to form a three dimensional image. The three dimensional image may be of a driver's face, or of a driver's head.

A facial information detection function 625 may use one or more images received from driver monitor cameras 211 and detect features of the driver's face including eyes, nose, mouth, and possibly ears. Detected facial features may include the position of the eyes, nose and mouth, and whether both ears are visible. Detected features may include whether the driver's mouth is open, or that the driver is yawning.

The facial information detection function 625 may also determine the position and/or movement of the driver's head. The facial information detection function 625 may determine that a driver's face is not facing a driver monitor camera(s) 211, and may identify the direction that the driver's head is facing. The facial information detection function 625 may detect that a driver's head is moved to a position that is not facing a forward facing direction. In some embodiments, the facial information detection function 625 may detect a three-dimensional position of the driver's face, which includes head tilt as well as head rotation.

An eye tracking function 623 measures either the point of gaze (where one is looking) or the motion of an eye relative to the head. An eye tracker is a device for measuring eye positions and eye movement. Video-based eye trackers typically use the corneal reflection (the first Purkinje image) and the center of the pupil as features to track over time. Corneal reflection (or Pupil Center Corneal Reflection eye tracking) typically uses infrared light (Infrared reflection).

Provided facial information from the facial information detection function 625, gaze and eye movement, state of the eye lid, from eye tracking function 623 a driver behavior prediction function 627 may be used to predict whether a driver is moving eyes and/or head to a new focus point. As will be discussed further below, driver behavior prediction may be implemented using a machine learning technique.

The eye tracking function 623 may also be configured to perform various other measurements including pupil dilation, saccade, and gaze eccentricity. Saccades serve as a mechanism to transition between fixations through rapid eye movement. When scanning immediate surroundings or reading, human eyes make saccadic movements and stop several times, moving very quickly between each stop. Human eyes move around, locating interesting parts of a scene and building up a mental, three-dimensional map corresponding to the scene. Measurements of saccade may include saccade velocity, acceleration, and frequency.

The eye tracking function 623 may be configured to perform measurements of eye gaze eccentricity, which is a deviation in the driver's gaze from center, usually measured in degrees of visual angle. Measurements may also include duration of eye gaze.

A human machine interface (HMI) 641 may include devices for visual and audio outputs.

An instrument display panel 215(315) may display vehicle status information.

A controller area network (CAN) 651 is a network that allows controllers and devices in a vehicle to communicate with each other without a host computer. Among other things, a CAN 651 may provide information about the performance of a vehicle, such as the wheel angle, vehicle speed and acceleration.

Figure 7:
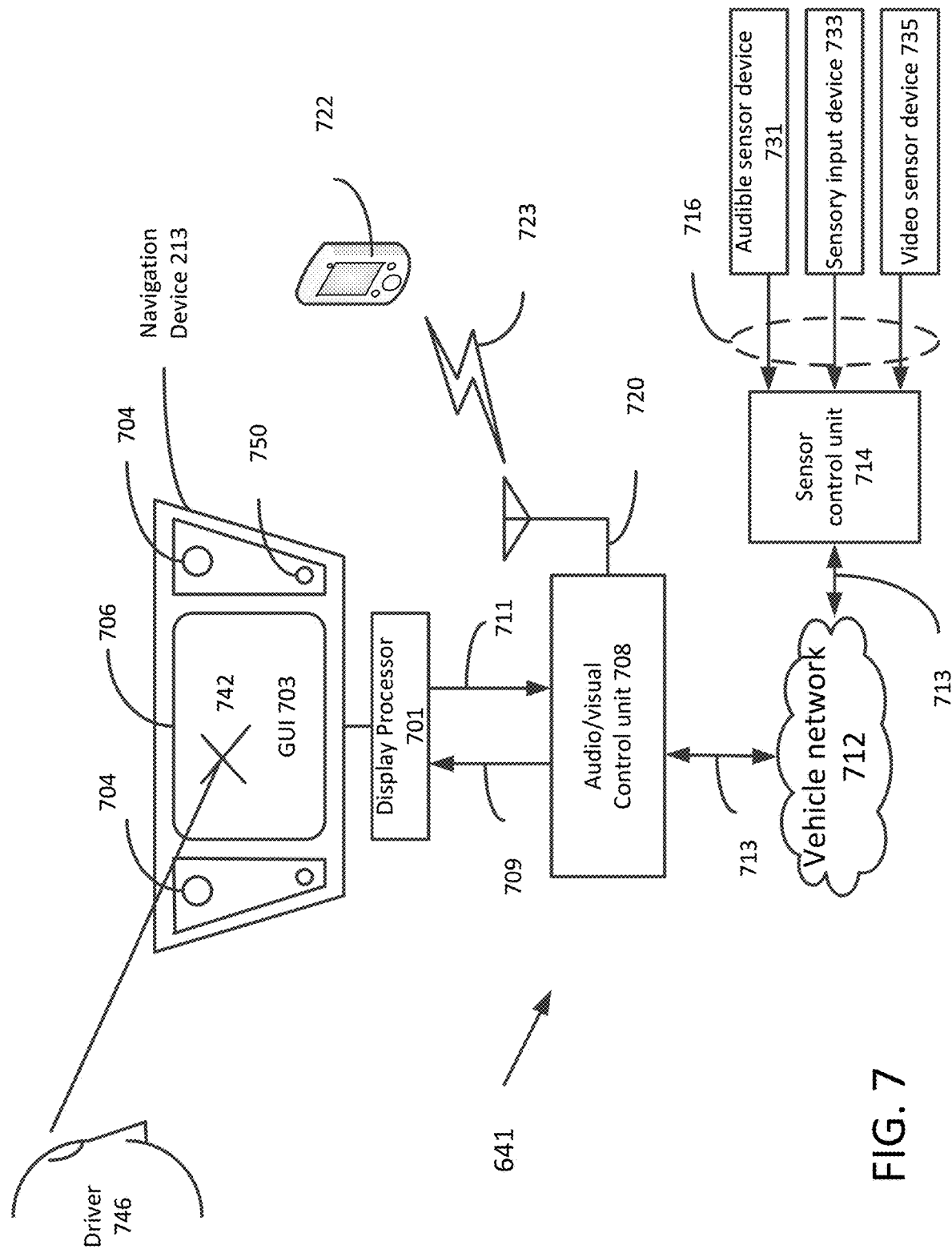
FIG. 7 is a schematic diagram of a human machine interface in accordance with an exemplary aspect of the disclosure.

FIG. 7 is a schematic diagram of a human machine interface in accordance with an exemplary aspect of the disclosure. While the human machine interface 641 is depicted in abstract with other vehicular components, the human machine interface 641 may be integrated with other system components of the vehicle 100 (see FIG. 1).

As shown in the example of FIG. 7, a vehicle navigation device 213 communicates through audio/visual control unit 708, which communicates with a sensor control unit 714 over a communication path 713 via vehicle network 712. The vehicle navigation device 213 may include an associated display processor circuit 701 for performing image processing functions.

As may be appreciated, the communication path 713 of the vehicle network 712 may be formed of a medium suitable for transmitting a signal such as, for example, conductive wires, conductive traces, optical waveguides, or the like. Moreover, the communication path 713 can be formed from a combination of mediums capable of transmitting signals. In one embodiment, the communication path 713 can comprise a combination of conductive traces, conductive wires, connectors, and buses that cooperate to permit the transmission of electrical data signals to components such as processors, memories, sensors, input devices, output devices, and communication devices. Accordingly, the communication path 513 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The sensor control unit 714 receives sensor data 716 from the audible sensor device 731, sensory input device 733, and video sensor device 735. For further example, the sensor data 716 operates to permit object detection external to the vehicle, such as other vehicles (including vehicles occupying a parking location), roadway obstacles, traffic signals, signs, trees, etc. The sensor data 716 allows the vehicle 100 (see FIG. 1) to assess its environment in order to maximize safety for vehicle passengers and objects and/or people in the environment. The sensor data 716 also provides information relating to a moving target, and to provide moving target indication (MTI) data.

As an example, the sensory input device 733 provides tactile or relational changes in the ambient conditions of the vehicle, such as an approaching person, object, vehicle, etc. The one or more of the sensory input devices 733 can be configured to capture changes in velocity, acceleration, and/or distance to objects relative to the travel of the vehicle 100, as well as an angle of approach. The sensory input devices 733 may be provided by a Light Detection and Ranging (LIDAR) system and/or milliwave radar devices. As an example, the sensory input devices 733 may identify objects in the roadway (such as other vehicle, debris, etc.), and may identify moving objects adjacent the roadway that may present a hazard to the vehicle 100 (such as animals and/or debris coming within the roadway).

Sensor data 716 relating to the video sensor devices 211 (see FIG. 2) operate to capture still-frame of and/or video images within associated fields of view for display to the touch screen 706 of the vehicle navigation device 213.

The audio/visual control unit 708 receives the sensor data 716 via the communication path 713 and vehicle network 712, and produces display data 709 for display by the touch screen 706. The audio/visual control unit 708 also receives user input data 711 from the vehicle navigation device 213, which may be from the tactile input 704, microphone 750, etc.

The audio/visual control unit 708 may include an antenna 720 for wireless communications 723 with user devices, such as a handheld mobile device 722.

The handheld mobile device 722, by way of example, may be a device including hardware (for example, chipsets, processors, memory, etc.) for communicatively coupling with a network cloud and/or directly with the audio/visual control unit 708 via the antenna 720, and also includes an antenna for such wireless communication.

The antenna 720 may include one or more conductive elements that interact with electromagnetic signals transmitted by global positioning system satellites. The received signals may be transformed into a data signal indicative of the location (for example, latitude and longitude positions), and further indicative of the positioning of the device 722 with respect a vehicle position, that can be indicated on a map displayed via the touch screen 706, or otherwise displayed via the vehicle GUI 703.

The wireless communications 723 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, Bluetooth low energy, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

The vehicle navigation device 213 includes, for example, tactile input 704, a touch screen 706, and microphone 750. The touch screen 706 operates to provide visual output or graphic user interfaces 703 such as, for example, maps, navigation, entertainment, information, infotainment, and/or combinations thereof.

The touch screen 706 may include mediums capable of transmitting an optical and/or visual output such as, for example, a cathode ray tube, light emitting diodes, a liquid crystal display, a plasma display, etc. Moreover, the touch screen 706 may, in addition to providing visual information, detect the presence and location of a tactile input upon a surface of or adjacent to the display. Accordingly, the display may receive mechanical input directly upon the visual output provided by the touch screen 506. Additionally, it is noted that the touch screen 406 can include at least one or more processors and one or more memory modules.

The vehicle navigation device 213 may also include tactile input and/or control inputs such that the communication path 713 communicatively couples the tactile input to other control units and/or modules of the vehicle 100 (see FIG. 1). The tactile input data may be provided by devices capable of transforming mechanical, optical, or electrical signals into a data signal capable of being transmitted via the communication path 713.

The tactile input 704 may include a number of movable objects that each transform physical motion into a data signal that can be transmitted over the communication path 713 such as, for example, a button, a switch, a knob, etc.

The touch screen 706 and the tactile input 704 may be combined as a single module, and may operate as an audio head unit or an infotainment system of the vehicle 100. The touch screen 706 and the tactile input 704 can be separate from one another and operate as a single module by exchanging signals.

Touch screen 706 may include a display screen, such as a liquid crystal display (LCD), light emitting diode (LED), plasma display or other two dimensional or three dimensional display that displays graphics, text or video in either monochrome or color in response to display data 709.

Figure 8:
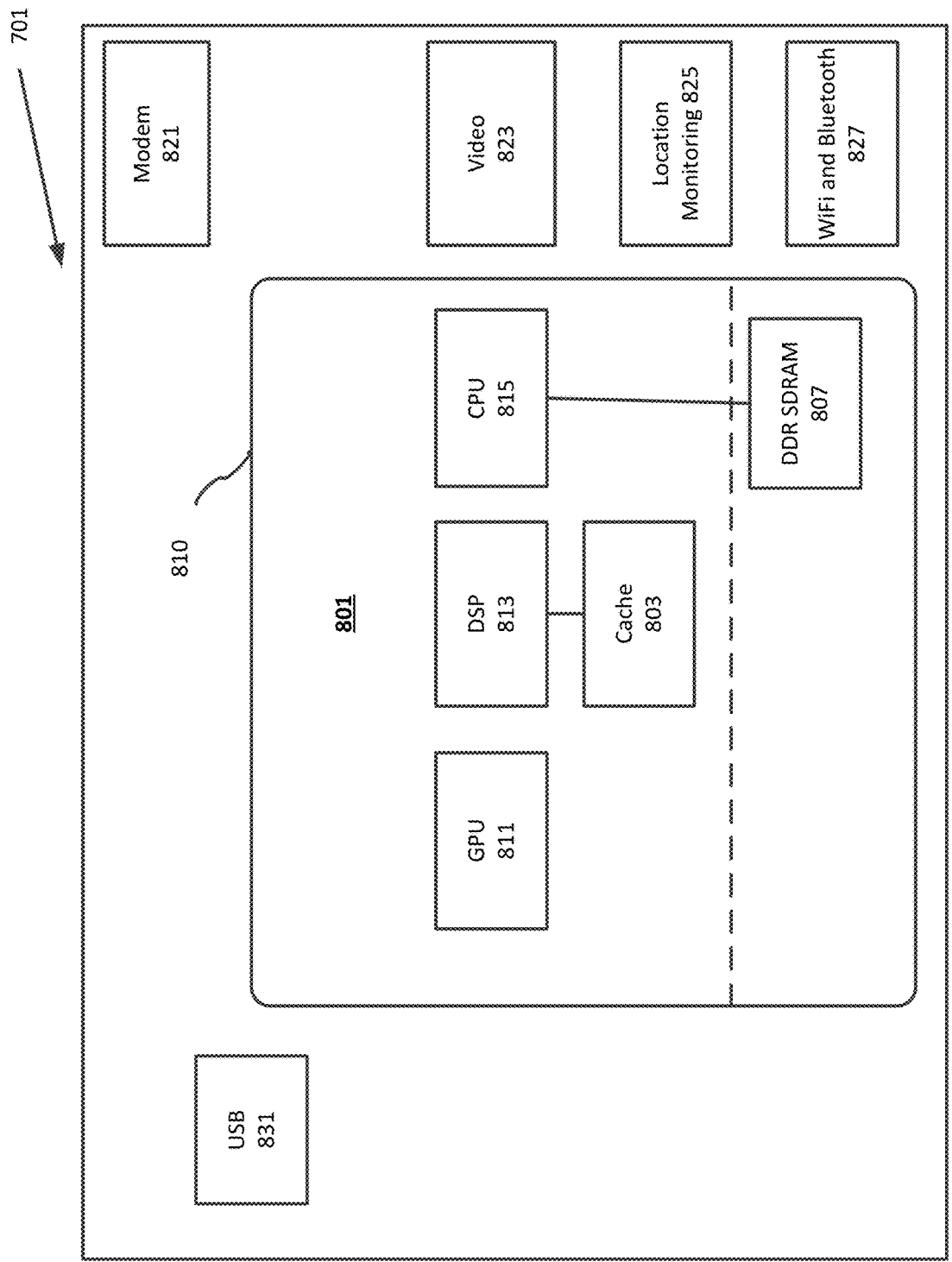
FIG. 8 is a block diagram of a display processing system for the human machine interface in accordance with an exemplary aspect of the disclosure.

FIG. 8 is a block diagram of a display processing system for the human machine interface in accordance with an exemplary aspect of the disclosure. The display processing system 701 provides support for simultaneous camera sensor inputs, video decoding and playback, location services, wireless communications, and cellular services. The display processing system 701 includes a central processing unit (CPU) 815, and may include a graphics processing unit (GPU) 811 and a digital signal processor (DSP) 813. The CPU 815 may include a memory, which may be any of several types of volatile memory 807, including RAM, SDRAM, DDR SDRAM, to name a few. The DSP 813 may include one or more dedicated caches 803 in order to perform computer vision functions as well as machine learning functions. The GPU 811 performs graphics processing for a 4K resolution display device. The GPU 811, DSP 813, CPU 815, Cache 803, and in some embodiments, a cellular modem 821, may all be contained in a single system-on-chip (SOC) 801. The display processing system 701 may also include video processing circuitry 823 for video decoding and playback, location service circuitry, including GPS and dead reckoning, and connectivity service circuitry, including WiFi and Bluetooth. The display processing system 701 may include one or more input/output ports, including USB connector(s), such as connectors for USB 2, USB 3, etc.

Machine Learning

Machine learning may be used to predict whether a driver is moving eyes and/or head to a new focus point. The machine learning model may be made off line using a supervised learning algorithm, such as a Support Vector Machine (SVM) or regression analysis, or may be made by a continuous learning algorithm, such as reinforcement learning.

Figure 9:
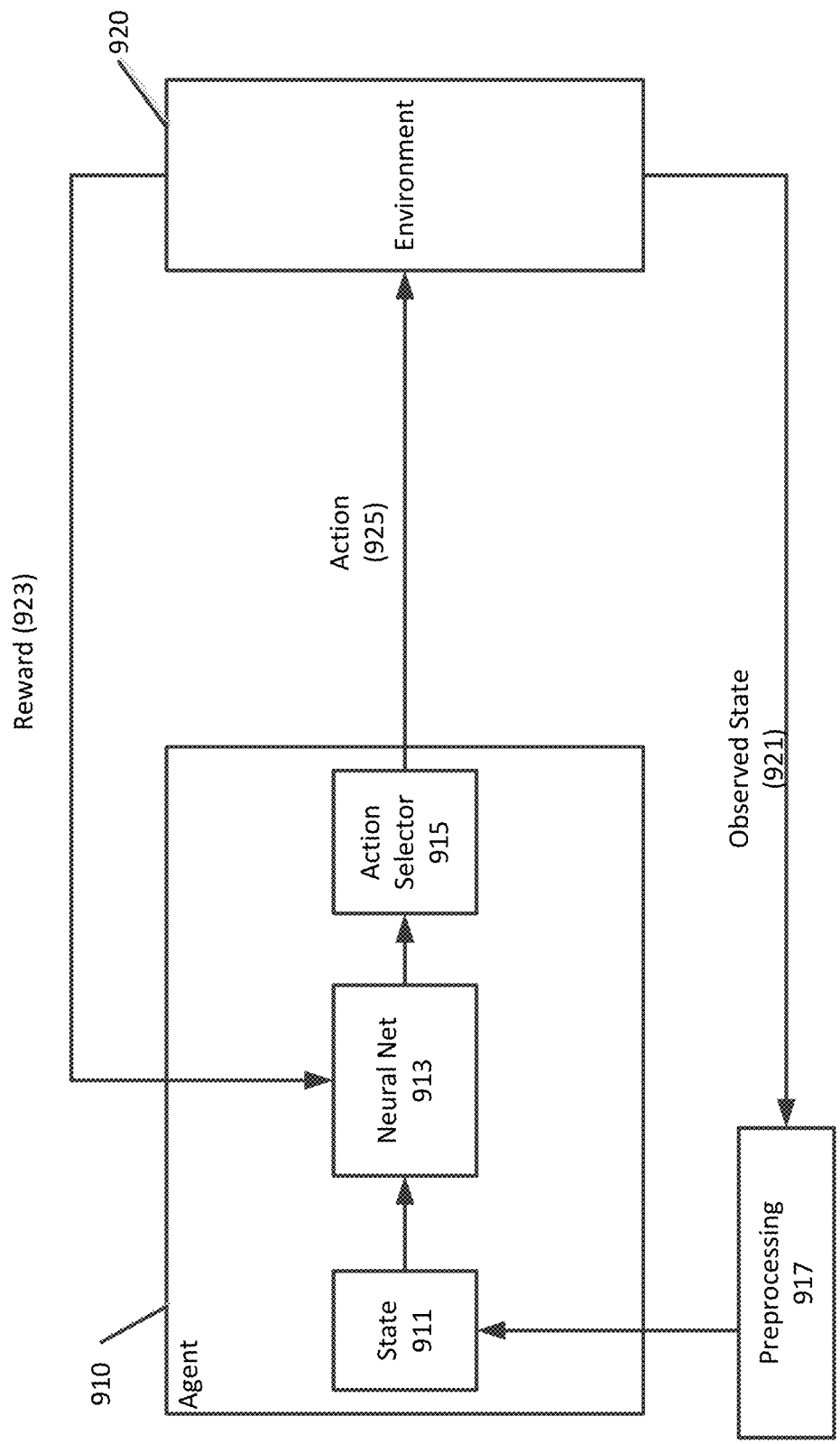
FIG. 9 is a block diagram of a reinforcement learning system in accordance with an exemplary aspect of the disclosure.

FIG. 9 is a block diagram of a reinforcement learning system in accordance with an exemplary aspect of the disclosure. In reinforcement learning, an agent 910 interacts with an environment 920 in discrete time steps. Learning is performed in an artificial neural network 913. The artificial neural network 913 may be a multi-layered network having at least one hidden layer. The input layer of the network 913 is arranged according to a vector representation of the state 911. The output layer of the network 913 will consist of one neuron for each possible action. At each time t, the agent 910 receives an observation which typically includes the reward. It then chooses 915 an action from the set of available actions (output from the neural network 913), which is subsequently sent to the environment 920. The environment 920 moves to a new state and the reward associated with the transition is determined. The goal of a reinforcement learning agent is to collect as much reward as possible. The agent 910 can (possibly randomly) choose any action as a function of the history.

The driver monitor system 600 may include feedback input from the driver to train a machine learning algorithm. Reinforcement learning allows for continuous learning and may learn based on the driver feedback. The driver monitor system's 600 sensors (Observed state 921) are fed to the artificial neural network 913, as state 911, which may detect a state of eye focus position or head movement. An action selector 915 will select an action 925, such as asking the driver, "Are you looking at something in the navigation panel intently right now?" for eye focus position or "Did you turn your head to look at something at this moment?" for head movement. A positive reward 923 (e.g., +1) will be awarded when the answer to the question is Yes. A negative reward 923 (e.g., −1) may be awarded when the answer to the question is No, or Not at all. A lower positive reward (e.g., +0.5) may be awarded when the answer to the question is Somewhat. The driver monitor system 200 may perform preprocessing 917 of sensor data, including quantifying the sensor data. For example, a 3-pt scale may be implemented (1—not at all, 2—somewhat, 3—yes) to help ordinate the sensor data.

The preprocessed state data 911 is then fed back into the artificial neural network 913 so that the system is able to more effectively and rapidly predict eye focus direction or head movement states for that specific driver and issue an appropriate action. For example, the eye gaze direction is fed back to the artificial neural network 913 which learns to predict whether the driver is transitioning into a new focus vision area that is outside the current focus vision area. Also, head movement is fed back to the artificial neural network 913 which learns to predict whether the user is transitioning into a focus vision area that is outside the current focus view area. Further, data from the external vehicle sensors may be used by the ECU 105 to monitor the position of the vehicle relative to the road. The vehicle position relative to road may vary and cause the driver to reorient gaze position. The position of the vehicle relative to the road may be fed back to the artificial neural network 913 which learns to predict whether the driver is transitioning into a new focus vision area that is outside the current focus vision area.

Parameters of the artificial neural network 913 that are learned may be stored in a memory, e.g., flash 503, as a profile associated with the driver. In some embodiments, independent profiles are stored in the memory in association with respective different users, including other drivers and passengers.

Figure 10:
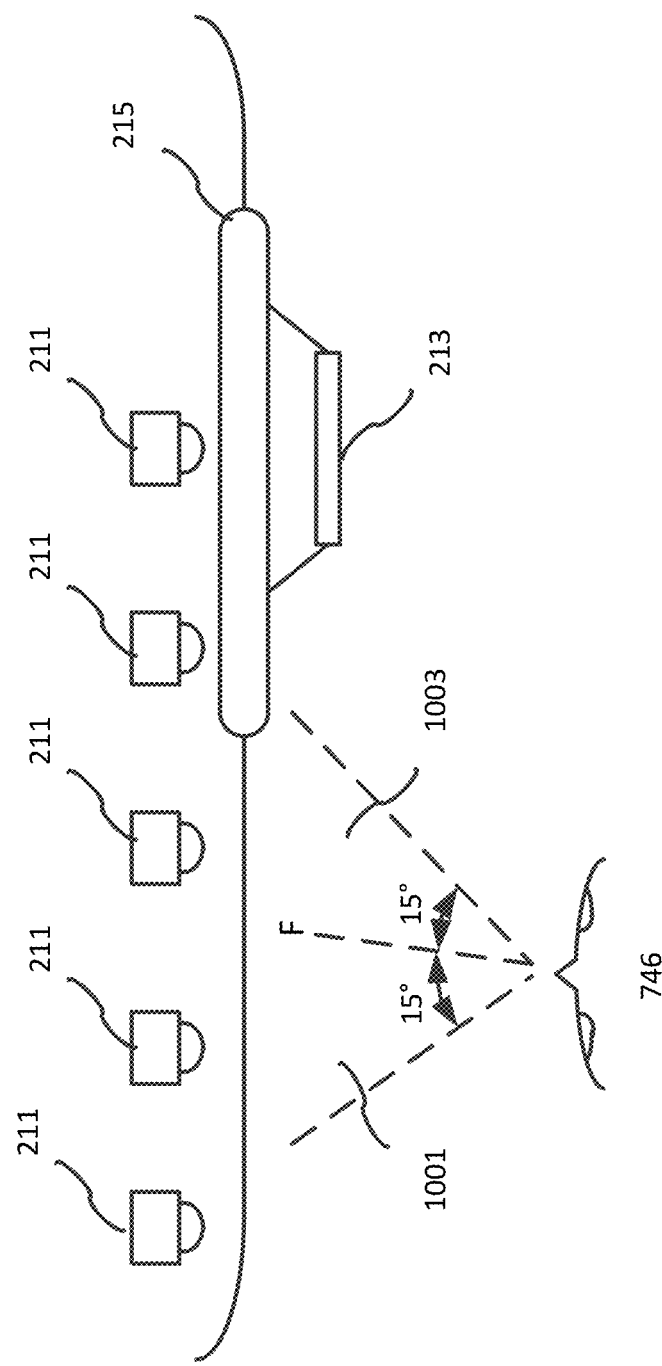
FIG. 10 illustrates a visual angle of a driver of a vehicle with respect to sensors and displays in accordance with an exemplary aspect of the disclosure.

FIG. 10 illustrates a visual angle of a driver of a vehicle with respect to sensors and displays in accordance with an exemplary aspect of the disclosure. For purposes of this disclosure, a driver 746, or passenger, is assumed to have a visual angle out to a peripheral view of each eye 1001, 1003 of approximately 15°. The driver 746, or passenger, is assumed to have a focus vision area (focal) in a range of about 3° to 5°.

Figures 11A, 11B:
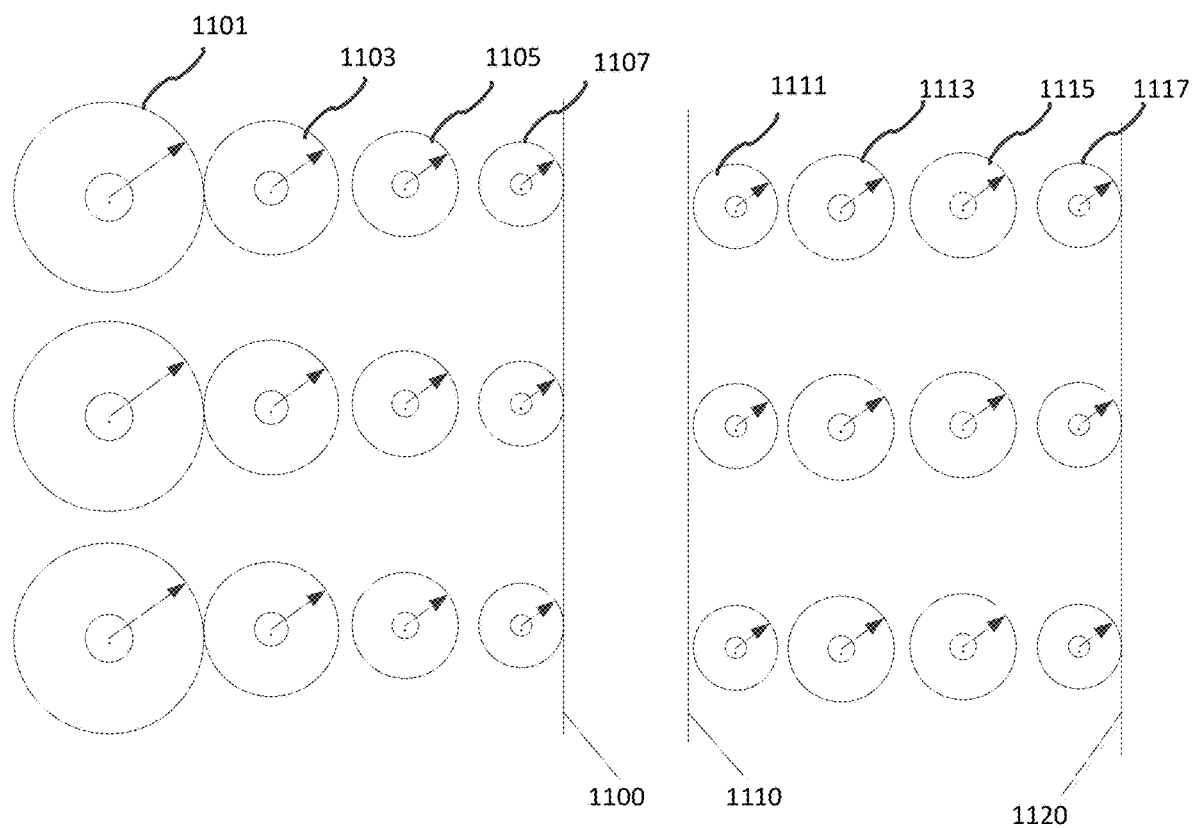
FIGS. 11A, 11B illustrates intensity variation for image region and line softening in accordance with an exemplary aspect of the disclosure.

FIGS. 11A, 11B illustrates intensity variation for edge softening in accordance with an exemplary aspect of the disclosure. Display processing for the instrument display panel 215 (315) and the navigation device 213 are controlled using predicted driver behavior from the driver behavior prediction function 627 and well as eye tracking information from the eye tracking function 623. The instrument display panel 215(315) may include display processing circuitry for digital display of vehicle status information, and the navigation device 213 may include dedicated display processing circuitry 701. Each display processor may be configured with a function that gently softens edges and lines, such as screen borders, wording, and logos that contain edges and/or lines. The softening does not blur peripheral content such that it is not readable, but rather makes edges and lines less crisp. In some embodiments, display processing for multiple display devices may be performed by a single graphics display module.

Regarding FIGS. 11A, 11B, gently softening of images out to edges and lines from sharp to less crisp is performed by adjusting color intensity of pixels based on pixel radius. The color intensity of a pixel may be adjusted by averaging color intensity of surrounding pixels within a certain radius. Pixels that do not have a full set of surrounding pixels, such as pixels on the edge of the image, may be adjusted based on an average color intensity of a partial set of surrounding pixels. Regarding FIG. 11A, an image region with an edge is softened by gradually adjusting color intensity of inner pixels based on the average color intensity of a relatively large pixel radius, next pixels based on a slightly smaller pixel radius, down to final edge pixels based on a relatively low pixel radius. In an example image region in FIG. 11A, a column of one or more pixels 1101 is adjusted for heavy intensity by averaging color intensity in a relatively large pixel radius, for example 10 pixel radius. A next column of one or more pixels 1103 are adjusted by averaging color intensity in a slightly lower pixel radius, such as a 7 pixel radius. A next column of one or more pixels 1105 are adjusted by averaging color intensity in a lower pixel radius, such as a 4 pixel radius. A final column of one or more pixels 1107 are adjusted by averaging color intensity in a lowest pixel radius, such as a 2 pixel radius. Because edge pixels are near an edge or border 1100 of the image region, the number of pixels that are averaged in a pixel radius will be less than a complete set of pixels (i.e., partial set of pixels) in a circle surrounding the center pixel.

In an example line in FIG. 11B, a line (shown here as 4 pixels wide) is softened by gradually reducing a pixel radius symmetrically from a center of a line outward to the edges 1110, 1120. In addition, any pixels outside the border of the edges 1110, 1120 and surrounding the line may also be softened. In some embodiments, the pixels surrounding the line may be softened to the same or greater extent as the pixels on the border of the edges 1110, 1120. The reduction in radius for determining average intensity is substantially symmetrical from a center of the line. Edge pixels 1111, 1117 are adjusted by averaging intensity over a pixel radius that is lower than pixel radius of interior pixels 1113, 1115.

As an alternative to, or in addition to, softening of image regions and lines may be performed by applying gradual levels of Gaussian noise. The gradual levels of Gaussian noise may be applied in a manner comparable to pixel radiuses as in FIGS. 11A and 11B.

The driver prediction behavior function 627 of the ECU 105 or the display processing system 701 may apply increasing levels of softening to image regions and/or lines in an image as the distance away from the eye gaze point increases. For example, an image region having edges and lines in the vicinity of the boundary of the user's focus vision area may be softened starting with a pixel radius of 10 pixels, with gradually decreasing pixel radius for pixels that are closer to the edge of the image region. Image regions and lines that are slightly further from the focus vision area may be softened starting with a pixel value of 9 pixels. Image regions and lines that are still further from the focus vision area may be softened starting with a pixel value of 8 pixels, and so on as the distance from the boundary of the focus vision area increases.

Figure 12A:
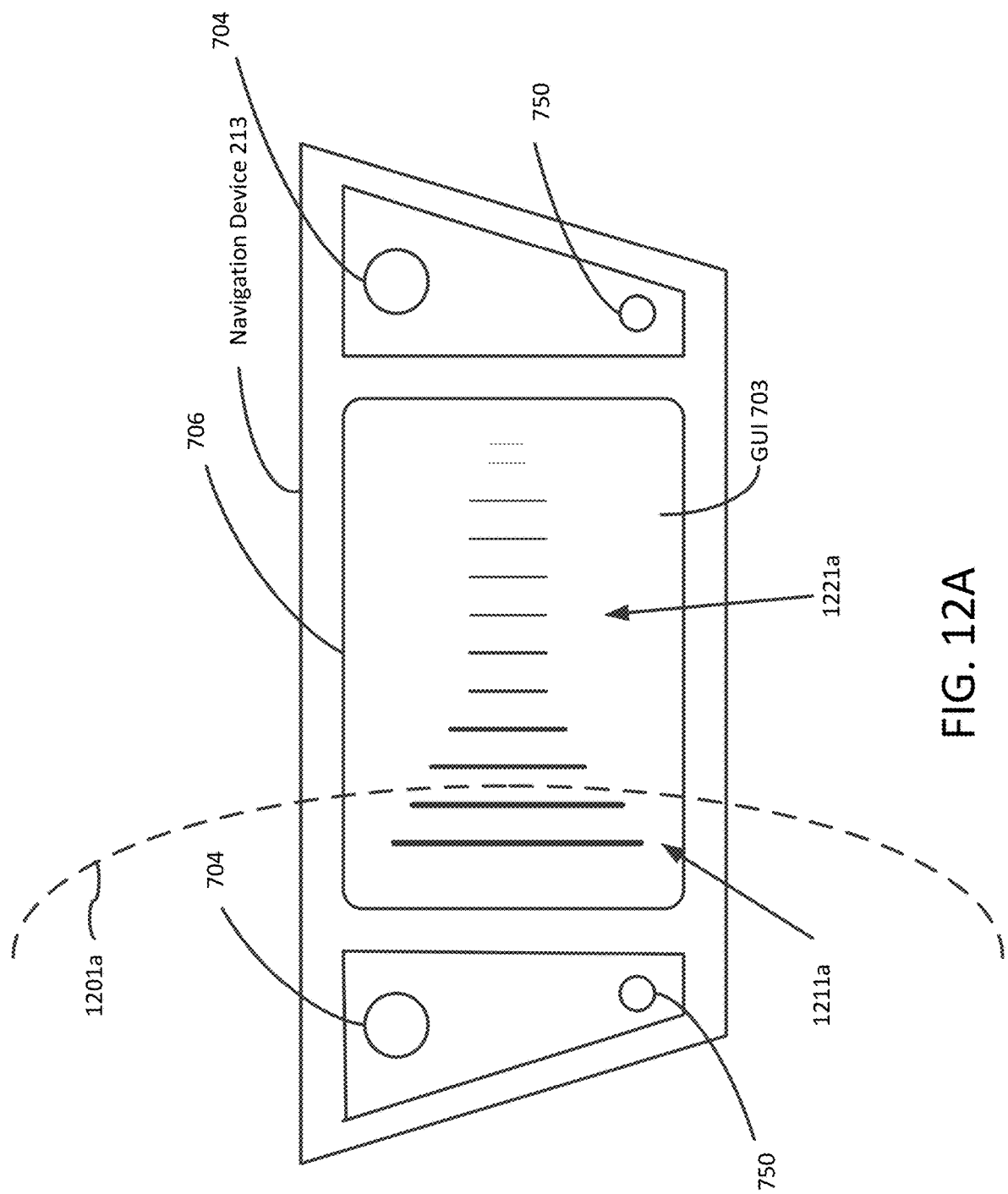
FIGS. 12A, 12B, 12C is a diagram of a human machine interface as the driver's eye gaze direction changes in accordance with an exemplary aspect of the disclosure.
Figure 12B:
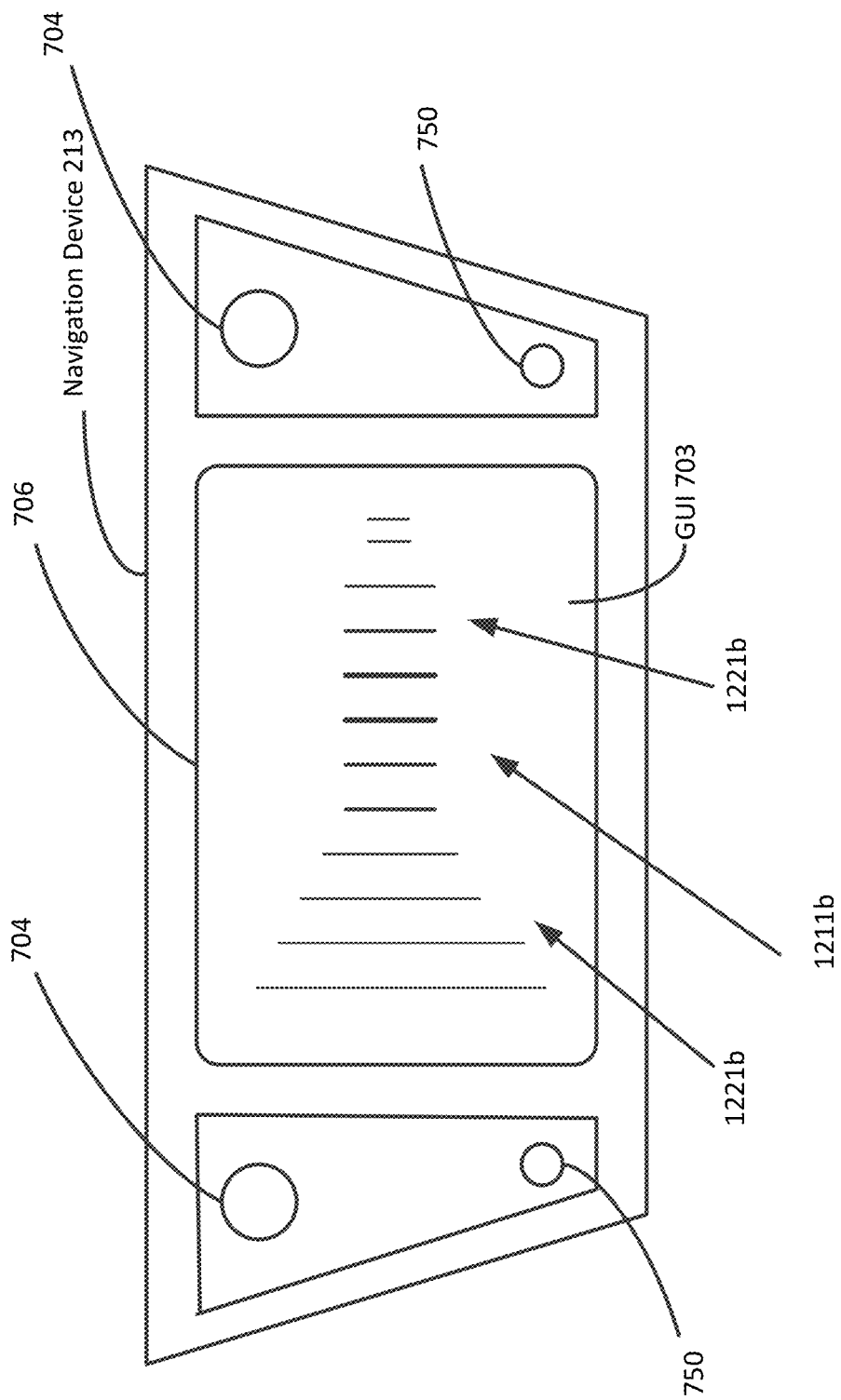
Figure 12C:
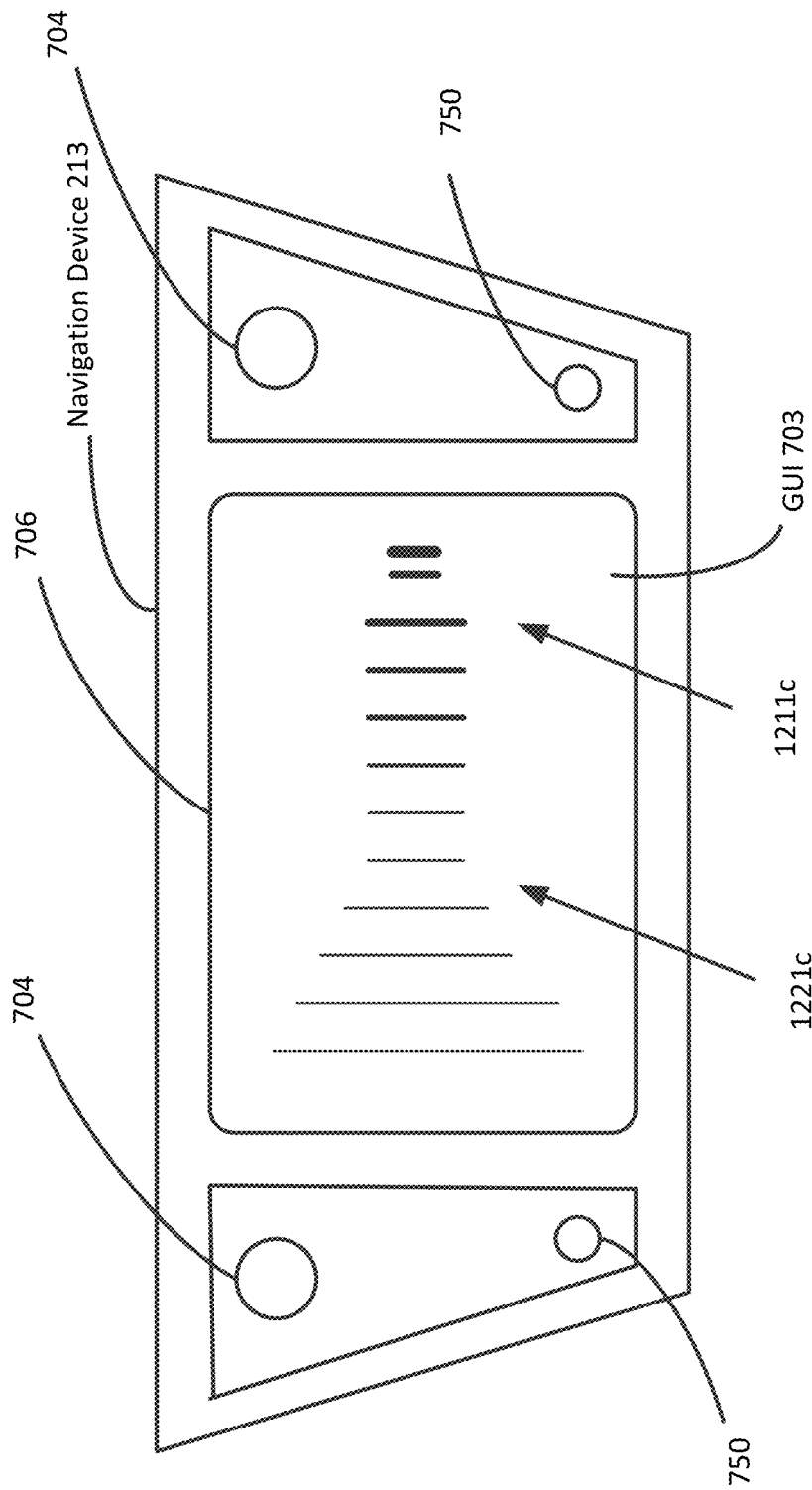

The increasing levels of softening to image regions and/or lines in an image as the distance away from the eye gaze point increases away from the periphery of the user may be shifted as the eye gaze point moves. FIGS. 12A, 12B, 12C is a diagram of a human machine interface as the driver's eye gaze point changes in accordance with an exemplary aspect of the disclosure. The driver prediction behavior function 627 of the ECU 105 or the display processing system 701 may be configured to predict head and eye movements based on data obtained from the eye tracking function 623 and facial information detection function 625. The driver's head 746 is assumed to be positioned relative to the human machine interface 213 as shown in FIG. 10. These drawings illustrate movement of the driver's eye gaze point from left to right. Regarding FIG. 12A, the displayed image 703 including image regions and lines 1211a within the driver's focus vision area (to the left of 1201a) is sharp, while image regions and lines 1221a outside the driver's focus vision area (to the right of 1201a) are gradually softened. Regarding FIG. 12B, a portion of the displayed image 703 including image regions and lines 1211b at a predicted new eye gaze point are sharpened, while image regions and lines 1221b outside the driver's focus vision area are gradually softened. Regarding FIG. 12C, a portion of the displayed image 703 including image regions and lines 1211c at a further predicted new eye gaze point are sharpened, while image regions and lines 1221c outside the driver's focus vision area are gradually softened.

As mentioned above, an object of the present disclosure is to increase cognitive resources when performing mission-critical tasks, in particular when driving in heavy rain, snowstorms, construction zones, or other potentially dangerous driving conditions. In disclosed embodiments, the driver prediction behavior function 627 of the ECU 105 or the display processing system 701 may perform image region/line softening and sharpening of a softened image when information based on external sensors 617 indicates dangerous driving conditions or other driving conditions that require highly focused attention of the driver.

Dangerous driving conditions may be determined using vehicle external sensors 617, using information obtained through vehicle-to-vehicle communications, using information obtained through an infotainment system, or through information obtained through an external service, via the Internet. An external service may provide weather and/or traffic information under a subscription plan, or as a feature offered with a vehicle. Information obtained through vehicle external sensors 617 or the vehicle navigation device 213 may provide vehicle location information or obtain vehicle location information in conjunction with a vehicle location service. Information obtained through vehicle-to-vehicle communications may include route traffic conditions, road conditions, or weather-related conditions. Weather-related conditions that may indicate potentially dangerous driving conditions may include potential flooded roads, areas of ice, or poor visibility in a route to be taken by the vehicle 100. Road conditions that may constitute potentially dangerous driving conditions may include areas of the road that are under construction, or where construction is taking place along the road, such as bridge construction/repair, road construction or repair to add lanes, repave lanes, or utility work. Traffic conditions that may constitute potentially dangerous driving conditions may include traffic congestion in an approaching area of the route, approaching an area having traffic signs, signals, intersections, such as a commercial section, a residential section or a school zone where traffic conditions may change. Other traffic conditions may include railroad crossings, areas of heavy pedestrian presence, roads having bicycle lanes or bicycle crossings. Weather-related conditions, road conditions and traffic conditions may vary dynamically as weather conditions, road conditions and traffic conditions change. For example, the occurrence of a traffic accident or downed tree can cause traffic conditions to suddenly change.

The driver prediction behavior function 627 of the ECU 105 or the display processing system 701 may sharpen a softened image when a prediction is made that the driver will shift head or eyes to look at a new gaze point 1211b in the image 703. The sharpening of the image may continue to shift to a further point 1211c depending on an anticipated movement of the driver's head or eyes. The driver prediction behavior function 627 of the ECU 105 or the display processing system 701 may begin sharpening a portion of the image 703 immediately when the eye tracking function 623 detects that the driver's eyes begin to move, and perform the sharpening such that by the time the driver's eyes have shifted, the portion of the image 1211b, 1211c has already reached full sharpness.

The driver prediction behavior function 627 of the ECU 105 or the display processing system 701 may perform the change from display of a softened edge or line to display of a sharp edge or line in an image quicker than the change from display of sharp to softened edge or line. The driver prediction behavior function 627 of the ECU 105 or the display processing system 701 may perform the change from display of sharp to softened edge or line at a reduced rate of change. The driver prediction behavior function 627 of the ECU 105 or the display processing system 701 may perform the change from display of sharp to softened edge or line by gradually softening each edge or line at each time step over a period of time, such as a few seconds, e.g., 2 or 3 seconds.

In some embodiments, the driver prediction behavior function 627 of the ECU 105 or the display processing system 701 may perform an abrupt change of an edge or line from softened to sharp in order to draw attention to a portion of the image having the softened edges and lines.

In some embodiments, a display for a human machine interface 641 may include a Head up display in which an image is projected and displayed on the windshield of a vehicle 100. The softening of the displayed image may include softening of the image displayed in the head up display that is outside the focus vision area of the driver.

In some embodiments, a display for a human machine interface 641 may make adjustments to a softened image that is in the focus vision area of a driver, in the case that a passenger in the passenger side of the vehicle 100 may view the softened image. The eye tracking function 623 may detect a passenger's eye gaze point to be to a point in the softened image and subsequently sharpen the image within a range of focus of the passenger (see FIG. 9), or sharpen a particular item or two in an image that is at a point of focus of the passenger, and maintain softened state for remaining sections of an image so as not to draw attention to the driver. Regarding FIG. 12B, a portion of the displayed image 703 including edges and lines 1211b at a predicted eye gaze point of the passenger are sharpened, while edges and lines 1221b outside the driver's focus vision area remain gradually softened.

In some embodiments, a fully autonomous vehicle may require assistance of a driver or a takeover of performance of certain driving-related functions by a driver, for example in an emergency situation. The driver prediction behavior function 627 of the ECU 105 or the display processing system 701 may perform an immediate and abrupt sharpening of items that the driver should focus on: such as speed, a warning, or other important items that had been softened. Also, the driver prediction behavior function 627 of the ECU 105 or the display processing system 701 may perform softening of edges and lines but may maintain sharpness in items that should remain sharp.

In some embodiments, external sensors 617 may detect a condition, such as a pothole, blind-side vehicle, an object, etc. that may require the driver's immediate attention. In some embodiments, road or traffic conditions may be made known to the vehicle by way of vehicle-to-vehicle communication. In such cases, the driver prediction behavior function 627 of the ECU 105 or the display processing system 701 may then display a sharp warning and/or notification in place of a softened image or image portion.

In some embodiments, government regulations may require certain displays; e.g., display of a digital speed limit in the vehicle. The driver prediction behavior function 627 of the ECU 105 or the display processing system 701 may be configured to always display images or part of a display as a sharp image that are required by government regulations.

In some embodiments, the driver prediction behavior function 627 of the ECU 105 or the display processing system 701 may be configured to maintain a softened state of an image even when a driver's eyes change to a focus point in the softened image. For example, if external sensors 617 or information obtained through vehicle-to-vehicle communication determines that there are heavy traffic conditions, there is an upcoming crosswalk, there is a stoplight or stop sign, there is a yield sign, there is a construction zone, or there are other conditions that may require the constant attention of the driver, the displayed image may be maintained in a softened state in order to discourage the driver from focusing on an image or an image portion.

In some embodiments, the driver prediction behavior function 627 of the ECU 105 or the display processing system 701 may be configured to maintain certain items in a displayed image in a sharp state, while other items are allowed to change from a sharpened state to a softened state. For example, if speed is an important information item that a driver should always be made aware of, a speed reading from a speedometer should be maintained in a sharp state. On the other hand, if fuel level is sufficient and there is reduced need to view a fuel gauge reading, the fuel gauge reading may be allowed to change from sharp to softened when out of focus vision area of a driver. In a similar manner, the display of a music station and song being played may be allowed to change from sharp to softened until the driver's eyes are detected as being moved to focus on the music display.

In some embodiments, a section of an image that has been sharpened when the user's eyes shift to a new focus point will revert back to a softened image after a predetermined period of time. The predetermined period of time may be a period of time that an average person would take to read text and/or understand a symbol in the image. The predetermined period of time may be a fixed period of time, such as 5 seconds.

Figure 13A:
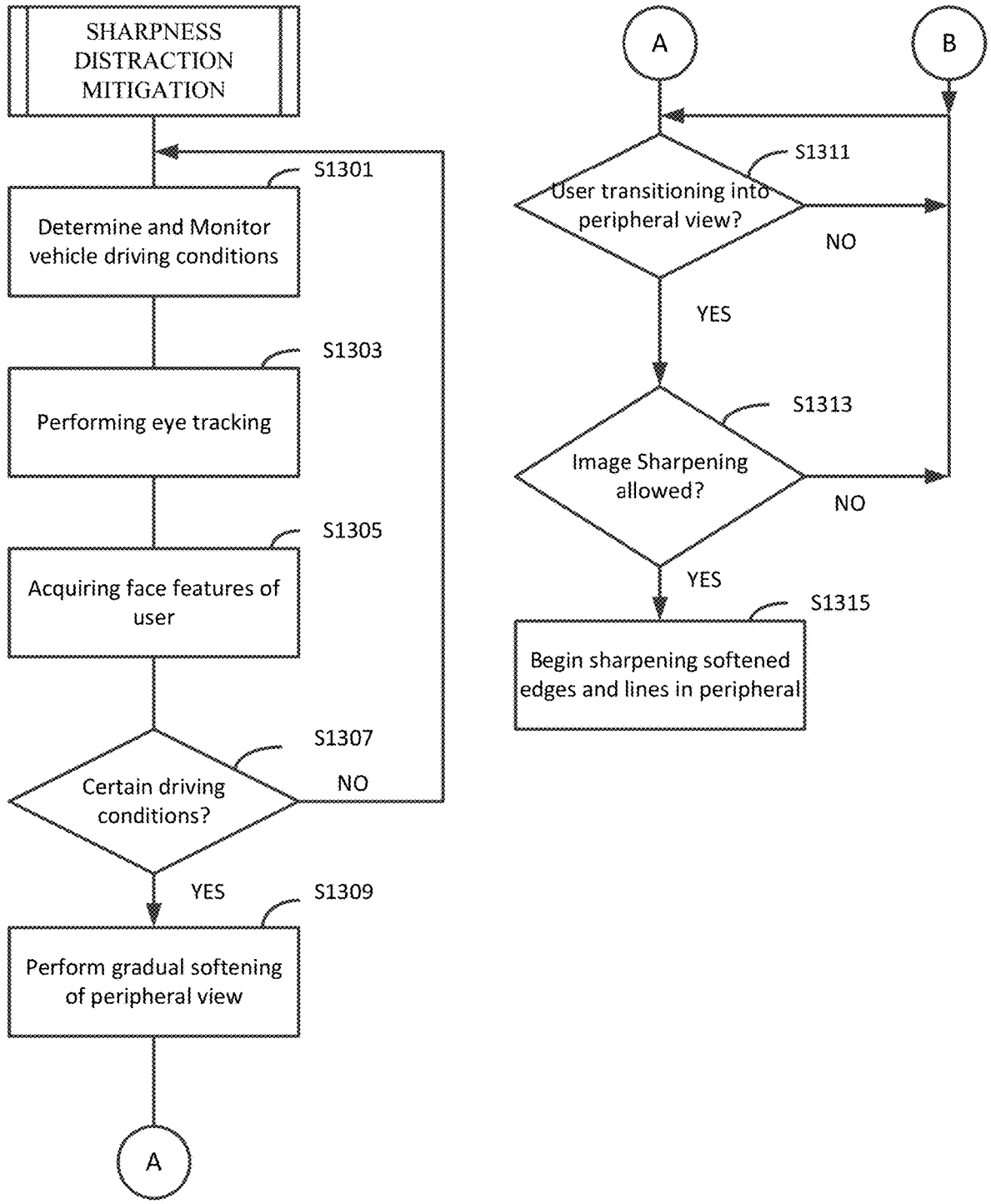
FIGS. 13A, 13B is a flowchart of sharpness distraction mitigation in accordance with an exemplary aspect of the disclosure.
Figure 13B:
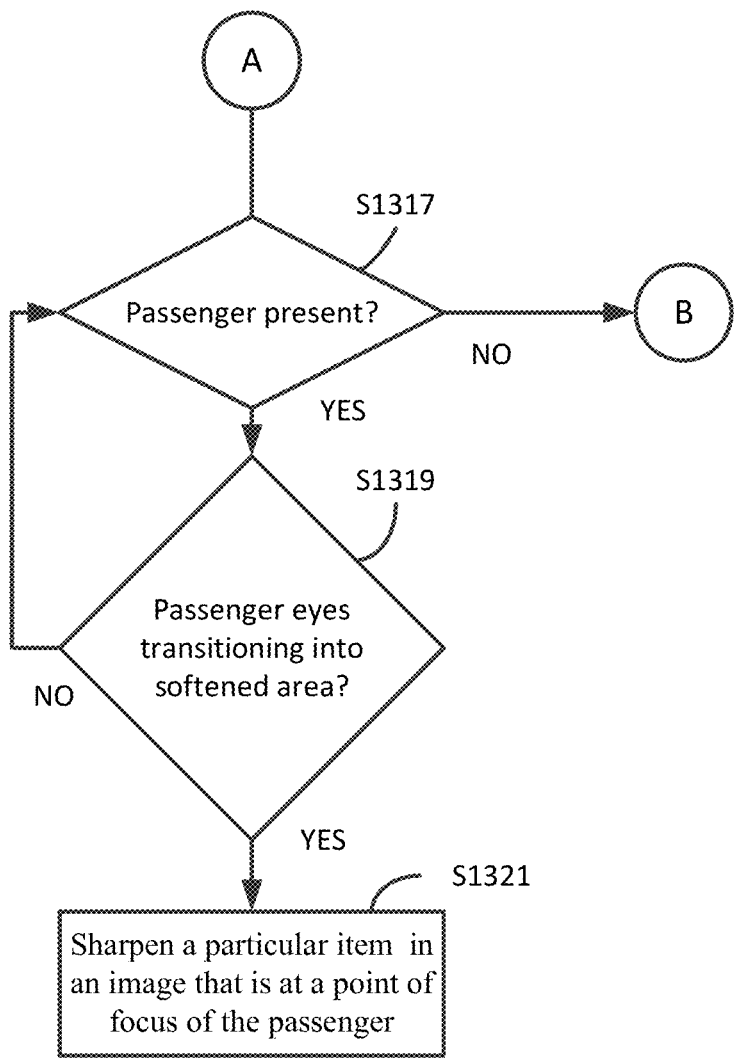

FIGS. 13A, 13B is a flowchart of sharpness distraction mitigation in accordance with an exemplary aspect of the disclosure. An ECU 105, in conjunction with information provided by HMI 641 and instrument panel 215(315) of a vehicle 100 may cycle through, S1301, performance of processing of information from external sensors 617 in order to monitor vehicle driving conditions, S1303, performance of eye tracking 623, S1305, performance of facial information detection 625. The facial information detection function 625 may detect that a driver's head is being moved to a position that is not facing a forward facing direction. In some embodiments, the facial information detection function 625 may detect a three-dimensional position of the driver's face, which includes head tilt as well as head rotation. The detection that a driver's head is being moved to a new position may be used to predict a change in the driver's eye gaze position.

The vehicle driving conditions may be checked, S1307, to determine if certain driving conditions are expected in a driving route. When certain driving conditions are detected (YES in S1307), such as potentially dangerous driving conditions or other driving conditions that may require heightened attention of the driver, in S1309, the driver prediction behavior function 627 of the ECU 105 or the display processing system 701 may perform gradual softening of displayed edges and lines in images in a focus vision area of a user.

In S1311, the driver prediction behavior function 627 of the ECU 105 or the display processing system 701 may predict whether a user is transitioning eye focus (eye gaze direction) into an area outside of the user's focus vision area containing softened edges and lines. If it is predicted that the user's eye focus is moving toward a focus vision area, in S1313, the driver prediction behavior function 627 of the ECU 105 or the display processing system 701 may determine whether sharpening of the image or image portion is allowed. As mentioned above, there may be conditions in which the driver must maintain focus on driving. If it is determined that sharpening of the image or image portion is allowed (YES in S1313), in S1315, the driver prediction behavior function 627 of the ECU 105 or the display processing system 701 may begin sharpening softened edges and lines in a region of a predicted eye gaze direction.

In S1317, the ECU 105 determines whether there is a passenger that also may view graphical user interface 703 in the touch screen 706. In S1319, the driver prediction behavior function 627 of the ECU 105 or the display processing system 701 may predict whether a passenger is transitioning eye focus into the focus vision area of the user containing softened edges and lines. In S1321, the driver prediction behavior function 627 of the ECU 105 or the display processing system 701 may sharpen a particular item in an image that is a point of focus of the passenger.

Numerous modifications and variations of the present invention are possible in light of the above teachings. It is therefore to be understood that within the scope of the appended claims, the invention may be practiced otherwise than as specifically described herein.

The invention claimed is:

1. A driver monitor system for optimizing use of cognitive resources of a user in a vehicle, the system comprising:

at least one in-cabin video camera;

a dashboard-mounted display device; and processing circuitry configured to:

monitor eye gaze direction using images from the at least one in-cabin video camera, gradually soften image regions and lines displayed in the display device that are outside a first peripheral view of the user of the vehicle, use the eye gaze direction to predict whether the user is transitioning into a new focus vision area that had been outside the first peripheral view, when the user's eyes begin to move, begin sharpening softened image regions and lines such that by the time eyes have shifted into the new focus vision area, the image regions and lines in the new focus vision area reach full sharpness, and display increasing levels of softening of image regions and lines displayed in the display device as the distance increases away from the first peripheral view, wherein the gradually softening is by gradually adjusting color intensity of inner pixels based on an average color intensity of a relatively large pixel radius, next further pixels away from the inner pixels based on a slightly smaller pixel radius, down to final edge pixels based on a smallest pixel radius, wherein the peripheral view is a peripheral view of each eye of 15 degrees, and wherein the processing circuitry is further configured to display increasing levels of softening of image regions and lines displayed in the display device as the distance increases away from the peripheral view of 15 degrees.

2. The driver monitor system of claim 1, further including a machine learning device and an audio-video device, wherein the audio-video device outputs a verification request and receives a response to the verification request, and wherein the eye gaze direction is fed back to the machine learning device which learns to predict whether the user is transitioning into the new focus vision area that had been outside the first peripheral view.

3. The driver monitor system of claim 2, wherein parameters of the machine learning device that are learned are stored in a memory as a profile associated with the user.

4. The driver monitor system of claim 3, wherein independent profiles are stored in the memory in association with respective different users.

5. The driver monitor system of claim 1, further comprising at least one exterior sensor for monitoring driving conditions,
wherein the processing circuitry is further configured to perform image region and line softening and sharpening of a softened image when information based on the at least one external sensor indicates dangerous driving conditions.

6. The driver monitor system of claim 2, wherein the processing circuitry further monitors head movement,
wherein the head movement is fed back to the machine learning device which learns to predict whether the user is transitioning into the new focus vision area that had been outside the first peripheral view.

7. The driver monitor system of claim 2, wherein the machine learning device learns by performing a reinforcement learning algorithm.

8. The driver monitor system of claim 2, further comprising at least one exterior sensor,
wherein the processing circuitry uses data from the at least one external sensor to monitor the position of the vehicle relative to the road, and
wherein the position of the vehicle relative to the road is fed back to the machine learning device which learns to predict whether the driver is transitioning into the new focus vision area that had been outside the peripheral view when the position of the vehicle relative to the road is veering out of lane.

9. The driver monitor system of claim 1, wherein the processing circuitry is further configured to
without delay perform the sharpening of a softened image region or line in an image in anticipation of the user shifting to a new focus vision area in the image, and perform the gradual softening of image regions and lines displayed in the display device over a delayed time period as the user shifts focus away from the focus vision area of the image.

10. The driver monitor system of claim 1, wherein the processing circuitry is further configured to
perform an abrupt change of an image region or line in an image from softened to sharp in order to draw attention.

11. The driver monitor system of claim 1, wherein the processing circuitry is further configured to
detect a passenger's eye focus to be to a point in the softened image regions and lines and sharpen the image regions and lines of an image within a range of focus vision area of the passenger, and maintain softened image regions and lines for remaining sections of an image so as not to draw attention to the user.

12. The driver monitor system of claim 1, wherein the processing circuitry is further configured to
determine whether sharpening is allowed and prevent sharpening of softened image regions and lines when sharpening is not allowed.

13. The driver monitor system of claim 5,
wherein the processing circuitry is configured to use data from the at least one external sensor to monitor driving conditions, and
wherein the processing circuitry displays a sharp warning and/or notification in place of the softened image regions and lines.

14. The driver monitor system of claim 1,
wherein the processing circuitry is further configured to maintain certain items in the peripheral view in a sharp state, while other items in the peripheral view are allowed to change from a sharpened state to a softened state.

15. The driver monitor system of claim 1,
wherein the image regions and lines that have been sharpened by the processing circuitry when the user's eyes shift to a new focus point revert back to softened image regions and lines after a predetermined period of time.

16. A method of optimizing use of cognitive resources of a user in a vehicle with a driver monitor system, the system including at least one in-cabin video camera, a dashboard-mounted display device, and processing circuitry, the method comprising:
monitoring, by the processing circuitry, eye gaze direction using images from the at least one in-cabin video camera;
gradually softening image regions and lines displayed in the display device that are outside a first peripheral view of the user of the vehicle;
using the eye gaze direction to predict whether the user is transitioning into a new focus vision area that had been outside the first peripheral view;
when the user's eyes begin to move, begin sharpening softened image regions and lines such that by the time eyes have shifted into the new focus vision area, the image regions and lines in the new focus vision area reach full sharpness, and
displaying increasing levels of softening of image regions and lines displayed in the display device as the distance increases away from the peripheral view, wherein the gradually softening is by gradually adjusting color intensity of inner pixels based on an average color intensity of a relatively large pixel radius, next further pixels away from the inner pixels based on a slightly smaller pixel radius, down to final edge pixels based on a smallest pixel radius.

17. The method of claim 16, wherein the system further includes a machine learning device and an audio-video device, the method further comprising:
outputting, by the audio-video device, a verification request and receiving a response to the verification request; and
feeding back the eye gaze direction to the machine learning device which learns to predict whether the user is transitioning into the new focus vision area that had been outside the first peripheral view.

18. The method of claim 17, wherein the system further includes at least one exterior sensor for monitoring driving conditions,
the method further comprising:
performing, by the processing circuitry, image region and line softening and sharpening of a softened image when information based on the at least one external sensor indicates dangerous driving conditions.

19. The method of claim 16, further comprising:
without delay performing the sharpening of a softened image region or line in an image in anticipation of the user shifting to a new focus vision area of the image, and performing the gradual softening of image regions and lines displayed in the display device over a delayed time period as the user shifts focus away from the focus vision area in the image.

* * * * *